US005857153A

United States Patent [19]
Lupien

[11] Patent Number: 5,857,153
[45] Date of Patent: *Jan. 5, 1999

[54] CELLULAR TELECOMMUNICATIONS NETWORK HAVING SEAMLESS INTEROPERABILITY BETWEEN EXCHANGES WHILE PROVIDING VOICE, ASYNCHRONOUS DATA AND FACSIMILE SERVICES IN MULTIPLE FREQUENCY HYPERBANDS

[75] Inventor: Francis Lupien, Montreal, Canada

[73] Assignee: Telefonaktiebolaget LM Ericsson (publ), Stockholm, Sweden

[ * ] Notice: The term of this patent shall not extend beyond the expiration date of Pat. No. 5,761,623.

[21] Appl. No.: 692,743

[22] Filed: Aug. 6, 1996

Related U.S. Application Data

[63] Continuation-in-part of Ser. No. 543,022, Oct. 13, 1995.

[51] Int. Cl.⁶ .................................................. H04Q 7/20
[52] U.S. Cl. .................... 455/422; 455/432; 455/436; 455/560
[58] Field of Search .................... 455/422, 432, 455/466, 436, 426, 509, 560, 433

[56] References Cited

U.S. PATENT DOCUMENTS

| | | | |
|---|---|---|---|
| 4,675,863 | 6/1987 | Paneth et al. | 370/334 |
| 5,249,220 | 9/1993 | Moskowitz et al. | 379/93.19 |
| 5,260,988 | 11/1993 | Schellinger et al. | 455/552 |
| 5,392,300 | 2/1995 | Borth et al. | 371/37.7 |
| 5,406,615 | 4/1995 | Miller, II et al. | 455/552 |
| 5,420,911 | 5/1995 | Dahlin et al. | 455/553 |
| 5,430,790 | 7/1995 | Williams | 455/414 |
| 5,446,553 | 8/1995 | Grube | 358/402 |
| 5,457,734 | 10/1995 | Eryaman et al. | 455/422 |
| 5,487,175 | 1/1996 | Bayley et al. | 455/422 |
| 5,504,803 | 4/1996 | Yamada et al. | 455/426 |
| 5,517,553 | 5/1996 | Sato | 455/552 |
| 5,537,410 | 7/1996 | Li | 370/465 |
| 5,594,781 | 1/1997 | Kozdon et al. | 455/442 |
| 5,638,412 | 6/1997 | Blakeney, II et al. | 375/377 |

OTHER PUBLICATIONS

Magnus Isaksson, Antony Bacon and Egil Groönstad; "D–AMPS 1900 –The Dual–Band Personal Communications System"; *Ericsson Review*; vol. 72, No. 2, 1995, Stockholm, SE, pp. 73–79.

Ph. Duplessis, P. Simmons; "Towards a Combined GSM 900 DCS 1800 System"; *Proceedings of the 5th Nordic Seminar on Digital Mobile Radio Communications*, DMR V, 1–3 Dec. 1992, Helsinki, FI, pp. 89–92.

Primary Examiner—William Cumming
Assistant Examiner—Thomas Bethea, Jr.
Attorney, Agent, or Firm—Steven W. Smith

[57] ABSTRACT

A system and method of providing seamless interoperability for a mobile station roaming between cellular telecommunication systems operating in multiple hyperbands such as the 1900-MHz PCS hyperband and the 800-MHz cellular telephone hyperband, utilizing United States cellular standards. An enhanced inter-exchange communications protocol based on IS-41 is utilized to communicate information required for seamless interoperability between mobile switching centers (MSCs). The enhanced inter-exchange communications protocol comprises a plurality of signaling messages and a plurality of modified message parameters within the signaling messages. The modified message parameters are modified to include information elements required for seamless interoperability between the multi-hyperband capable exchanges and are added as optional (overriding) parameters to the signaling messages.

19 Claims, 13 Drawing Sheets

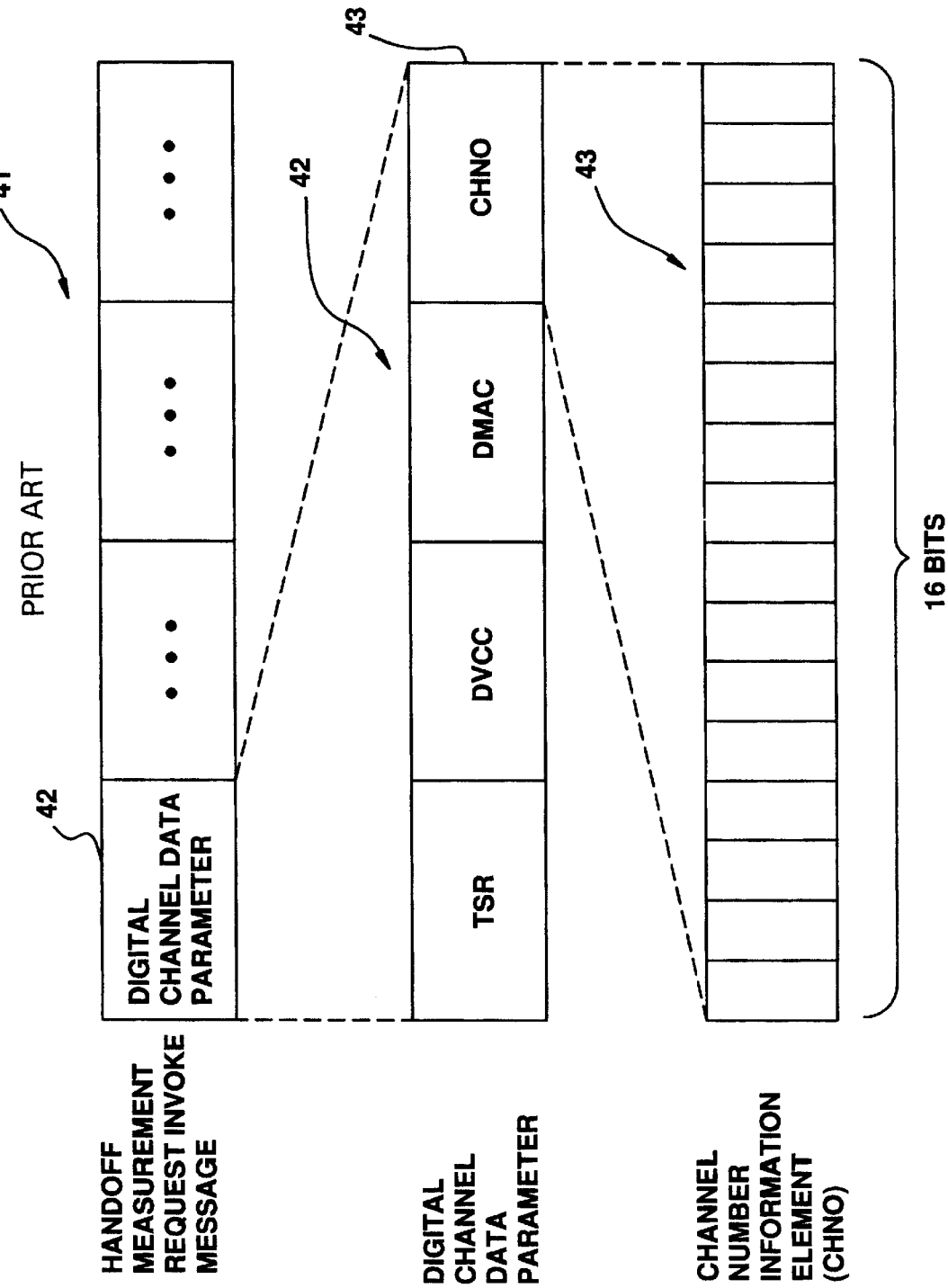

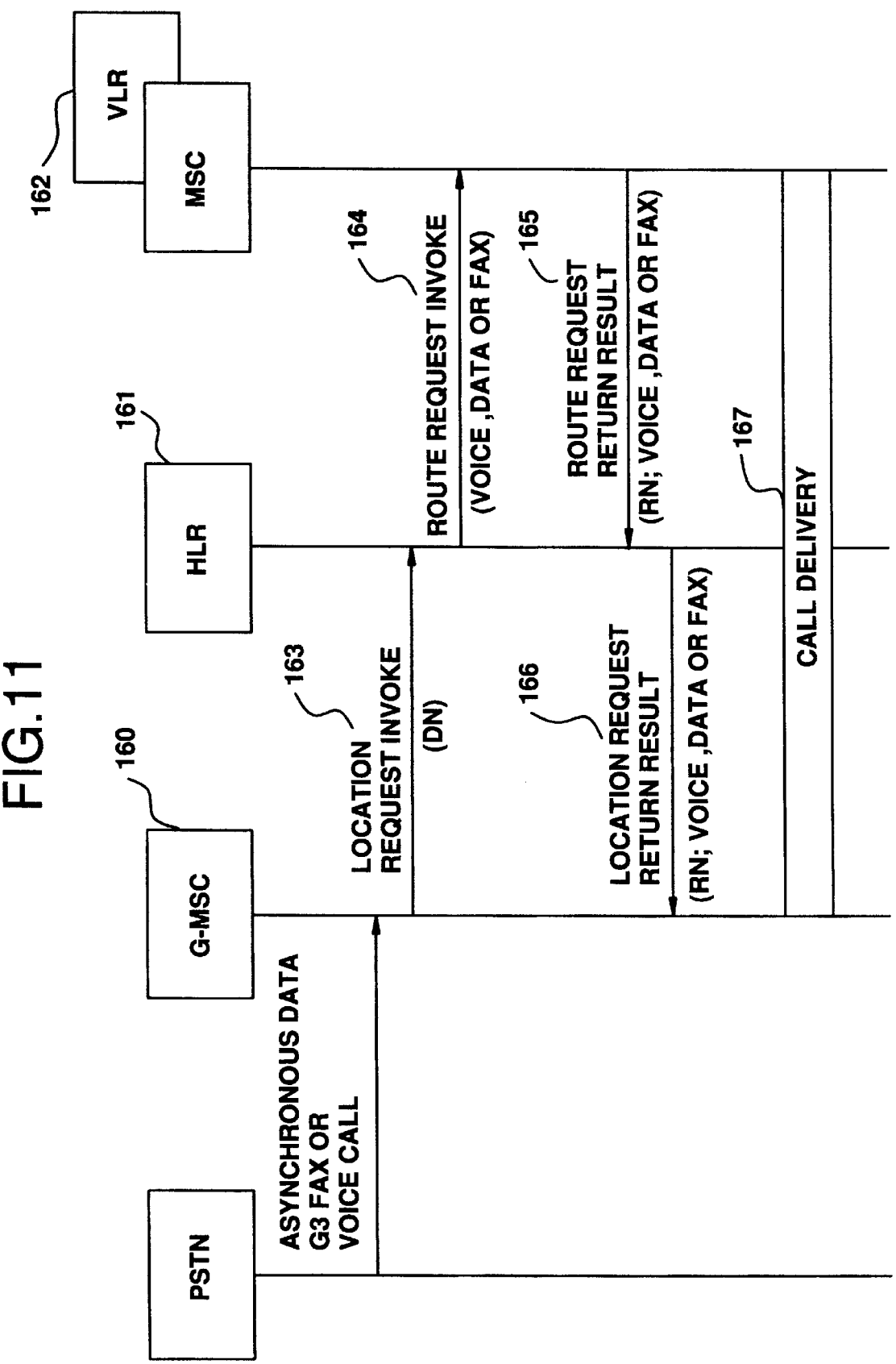

1

CELLULAR TELECOMMUNICATIONS NETWORK HAVING SEAMLESS INTEROPERABILITY BETWEEN EXCHANGES WHILE PROVIDING VOICE, ASYNCHRONOUS DATA AND FACSIMILE SERVICES IN MULTIPLE FREQUENCY HYPERBANDS

CROSS REFERENCE TO RELATED APPLICATION

This application is a continuation-in-part of U.S. patent application Ser. No. 08/543,022, titled "Cellular Telecommunications Network Having Seamless Interoperability Between Exchanges While Supporting Operation in Multiple Frequency Hyperbands," filed Oct. 13, 1995 and hereby incorporated by reference as if quoted in its entirety herein.

BACKGROUND OF THE INVENTION

1. Technical Field of the Invention

This invention relates to cellular telecommunications networks and, more particularly, to a cellular telecommunications network utilizing United States cellular standards and providing seamless interoperability between exchanges operating in both 800-MHz and 1900-MHz hyperbands.

2. Description of Related Art

North American cellular telecommunications networks have traditionally operated in two frequency bands (A and B) in the 800-MHz hyperband. The most recent evolution in cellular telecommunications involves the adoption of six additional frequency bands (A–F) in the 1900-MHz hyperband for use in handling mobile and personal communications. The 1900-MHz hyperband is also known as the Personal Communication Services (PCS) hyperband. Frequency bands within the 800-MHz hyperband and the 1900-MHz hyperband are defined in EIA/TIA Standard IS-136 and the PN3388-1 and PN3388-2 Specifications, which are hereby incorporated by reference herein. Other standards which define cellular telephone operations in North America include EIA-627, EIA-553, and the intersystem signaling standard IS-41 which are also incorporated by reference herein.

Each of the frequency bands specified for the cellular and PCS hyperbands is allocated a plurality of voice or speech channels and at least one access or control channel. The control channel is used to control or supervise the operation of mobile stations by means of information transmitted to and received from the mobile stations. Such information may include, but is not limited to, incoming call signals, outgoing call signals, page signals, page response signals, location registration signals, voice channel assignments, maintenance instructions, short message service (SMS) messages, and cell selection or reselection instructions as mobile stations travel out of the radio coverage of one cell and into the radio coverage of another cell. The voice channel is used to carry subscriber telephonic communications as well as messages requesting mobile station assistance in making hand-off evaluations. The control and voice channels may operate in either an analog mode or a digital mode.

Existing cellular telephone networks may simultaneously support radio telecommunications on multiple frequency bands. For example, a mobile switching center (MSC) may control transmission and reception equipment at a base station to operate one cell in the 800-MHz hyperband and another cell in the 1900-MHz hyperband. In addition, adjacent exchanges, controlled by different MSCs, may have cells that operate in the 800-MHz hyperband or cells that operate in both the 800-MHz and 1900-MHz hyperbands. Thus, as a mobile station roams throughout the coverage area of a single MSC, or from one MSC to another, the mobile station may pass to and from any combination of cells operating in the 800-MHz hyperband and dual-hyperband capable cells operating at both 800 MHz and 1900 MHz. As more frequency hyperbands come into use, roaming mobile stations will roam through an increasingly complex map of available hyperbands.

As a mobile station roams out of the coverage area of a cell, measurements of signal strengths of neighboring cells must be taken to assess whether the mobile station should reselect a particular neighboring cell for service (when in the idle mode) or be handed off to the neighboring cell (when in the busy mode). Existing cellular telecommunications networks, however, are not capable of performing the functions necessary to provide seamless interoperability between cells operating in different hyperbands and in different MSCs.

Telephone calls involving asynchronous data and facsimile (fax) services impose additional requirements on the telecommunication network. In order to establish and maintain a robust connection acceptable for the transmission of data and fax services between exchanges, an enhanced intersystem signaling protocol is required to communicate a set of commands between MSCs. This enhanced intersystem signaling protocol is distinctly different from the protocol necessary for voice transmission, and must provide a terminating MSC with information necessary in call delivery and/or handoff of voice, data or fax calls. In addition, intersystem signaling messages must provide information and verification on whether a particular subscriber has authorization to use the data and fax services.

Although there are no known prior art teachings of a solution to the aforementioned deficiency and shortcoming such as that disclosed herein, a prior art reference exists that discusses subject matter that bears some relation to matters discussed herein. One such prior art reference is U.S. Pat. No. 5,446,553 to Grube. This reference is discussed briefly below.

Grube relates to a wireless fax reception method with roaming. Specifically, the patent provides for a communication device, which roams within a communication system, the ability of maintaining contact with other communication units, even while the unit is away from its home sub-system. The communication system comprises a wide area paging system which includes a wide area paging controller (WAPC) which controls at least one local area paging controller. When the communication unit is away from its home system, the home system sends out a page via the wide area paging system in order to locate the communication unit and directs the unit to a local sub-system which the unit can use to communicate with the calling unit. However, Grube does not teach or suggest a wireless phone system since there are no call delivery principles underlying the invention. Additionally, the roaming described in this patent is not at the level necessary for use by a mobile phone system.

It would be a distinct advantage to have a cellular telecommunications network capable of controlling overlapping or adjacent cells operating in multiple hyperbands and in different MSCs in such a way that mobile stations capable of operating in multiple hyperbands may operate seamlessly between such cells for voice, data and fax services. It is an object of the present invention to provide such a cellular telecommunications network.

SUMMARY OF THE INVENTION

In one aspect, the present invention is a cellular telecommunications network providing seamless interoperability for a mobile station roaming between multi-hyperband capable exchanges. The cellular telecommunications network comprises a plurality of multi-hyperband capable mobile switching centers (MSCs), a plurality of base stations connected to each of the plurality of MSCs that have transmission and reception equipment operating in a plurality of frequency hyperbands, and an inter-exchange communications protocol for communicating information required for seamless interoperability between the MSCs. The inter-exchange communications protocol comprises a plurality of signaling messages in an industry standard message format and a plurality of modified message parameters within the signaling messages. The modified message parameters are modified to include information elements required for seamless interoperability between the multi-hyperband capable exchanges.

In another aspect, the present invention is a method of providing seamless interoperability for a mobile station roaming between a plurality of multi-hyperband capable exchanges in a cellular telecommunications network. The method comprises the steps of connecting a plurality of multi-hyperband capable mobile switching centers (MSCs) to a plurality of base stations having transmission and reception equipment operating in a plurality of frequency hyperbands, and communicating information between the MSCs with an inter-exchange communications protocol having a plurality of signaling messages comprising a plurality of message parameters. The communicating step further comprises the steps of formatting the plurality of signaling messages in an industry standard message format and modifying the plurality of message parameters to include information elements required for seamless interoperability between the multi-hyperband capable exchanges.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 3 (Prior Art) is an illustrative drawing of a signaling message constructed in accordance with the standard IS-41 intersystem communications protocol and showing a hierarchy of message parameters and information elements;

FIG. 11 is a signaling diagram illustrating two-stage dialing call delivery between a G-MSC and another MSC;

DETAILED DESCRIPTION OF EMBODIMENTS

The present invention is a system and method of providing seamless interoperability between cellular systems operating in multiple hyperbands. Although the present invention is not limited to specific frequency bands or a fixed number of hyperbands, the exemplary embodiment described herein discloses a cellular telecommunications network utilizing United States cellular standards and providing seamless interoperability between exchanges operating channels in both the 800-MHz cellular telephone hyperband and the 1900-MHz PCS hyperband.

Figure 1:
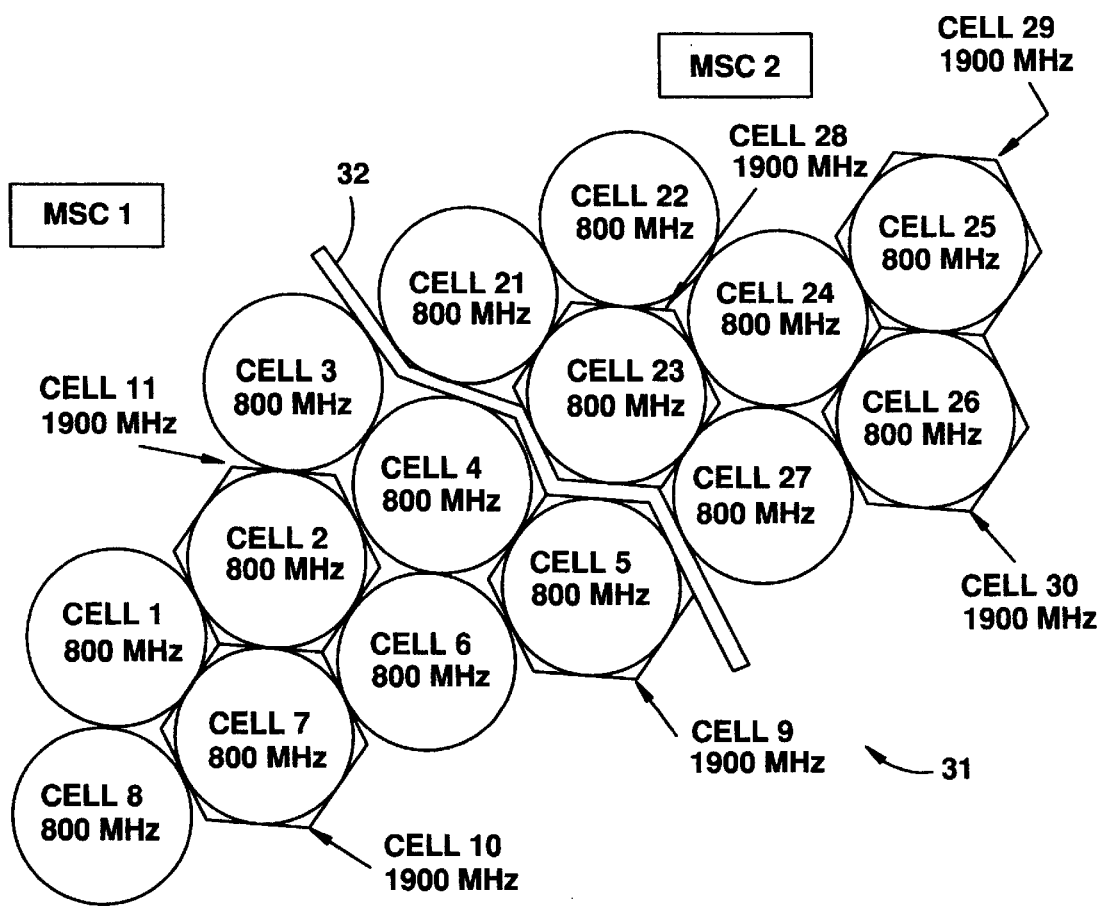
FIG. 1 is an illustrative drawing of a portion of a cellular telecommunications network suitable for implementation of the present invention.

FIG. 1 is an illustrative drawing of a portion of a cellular telecommunications network 31 suitable for implementation of the present invention. A dark boundary line 32 divides the network into one exchange controlled by MSC 1 and another exchange controlled by MSC 2. Although not shown for simplicity, MSC 1 and MSC 2 are connected by microwave links, fiber optics, cables, or otherwise to base stations in each of the cells in their respective service areas. Cells operating in the 800-MHz hyperband only are illustrated as circles. Cells operating in the 1900-MHz PCS hyperband are illustrated as hexagons. Dual-hyperband capable cells, and areas of overlapping 800 MHz and 1900 MHz cells, are, illustrated for illustrative purposes as concentric circles and hexagons. The presence of single-band cells and dual-hyperband capable cells is illustrative only. The present invention is also suitable for networks comprising all dual-hyperband capable cells or all multi-hyperband capable cells, or combinations thereof.

As previously noted, a mobile station may roam throughout the coverage area of, for example, MSC 1, or from the coverage area of MSC 1 to MSC 2. In doing so, the mobile station may pass to and from dual-hyperband capable cells operating at both 800 MHz and 1900 MHz. As a mobile station roams out of the coverage area of a cell, measurements of signal strengths of neighboring cells must be taken to assess whether the mobile station should reselect a particular neighboring cell for service ("cell reselection" in the idle mode) or be handed off to one of the neighboring cells ("handoff" in the busy mode). In each instance of cell reselection or handoff, the system must ascertain whether the mobile station should operate in the 800-MHz hyperband or in the 1900-MHz hyperband. For example, a multi-hyperband capable mobile station may operate in the 800-MHz hyperband in Cell 5, and may roam from Cell 5 into the area covered by Cell 23 (800 MHz) and Cell 28 (1900 MHz). Signal strength measurements, taken at both 800 MHz and 1900 MHz, may indicate that the signal strength at 1900 MHz is significantly better than the signal strength at 800 MHz, thus initiating a handoff to Cell 28.

The preferred embodiment of the present invention utilizes and modifies the IS-41 standard intersystem communications protocol. The present invention defines a series of extensions to IS-41 standard messages in order to transfer information between multi-hyperband exchanges and to provide for seamless interoperability in cellular systems utilizing United States cellular standards. No new messages are required. A set of message parameter extensions replace existing IS-41 message parameters and provide for multi-exchange, multi-hyperband seamless interoperability through "Enhanced IS-41" signaling. Some required functions may be implemented utilizing standard IS-41 signaling. Other functions may be implemented utilizing Enhanced IS-41 signaling.

The functionality required for seamless interoperability between multi-hyperband exchanges may be implemented in other ways in alternative embodiments. For example, existing information elements within message parameters may be modified and extended to include the additional data required for coordination of both 800-MHz and 1900-MHz systems. However, this method is cumbersome and "messy" due to length restrictions on certain information elements, the fixed format of information elements within parameters, and fixed formats of the parameters themselves. All the messages in IS-41 are octet formatted, therefore, this method requires that another 8-bit information element be tagged onto the back of a message parameter with the additional information needed. Some information elements would need to be reformatted to comply with new definitions, formats, or to accept new values. The total information element may not be contiguous, and the solution is complicated and confusing. By way of example, the existing Digital Channel Data (DCD) and Call Mode (CM) parameters have fixed lengths which limit the number of information elements they contain. The format and range of values of some of those information elements are also restricted. Therefore, these factors make it difficult to accommodate the new additional information required for the simultaneous support of 800-MHz and 1900-MHz systems. Consequently, when utilizing this method, an additional 8-bit information element must be tagged onto the message parameter in order to provide the additional channel number (CHNO) information required in the DCD message parameter.

Another method of implementing the functionality required for seamless interoperability between multi-hyperband exchanges is to implement entirely new messages specifically for 1900-MHz support. This method creates and implements new messages pertaining to 1900-MHz support to be sent between relevant nodes. This method however, has a higher cost of implementation than alternative methods and could pose standardization problems.

In the preferred embodiment, new IS-41 message parameters with enhanced information elements are defined. This method involves creating new parameters containing the relevant information elements and is the most direct method of all three, with the least impact on the standard IS-136 air interface information. The basic methodology involves keeping information intact as it flows from the base station through the cellular network. Parameter formats remain the same as those received from the mobile station on the air interface. Messages are then easier to verify in the network. Certain message parameters are modified or replaced with new optional parameters so that new functionality is achieved without changing message formats. Changes are then transparent to the network. The method thus provides an optimal solution as an overall migration strategy for a common interface and simplifies issues relating to existing functionality and backward compatibility.

Location, Presence Verification, and Handoff are three procedures required to hand over an ongoing call from cell to cell while maintaining high signal quality as a mobile station moves around in a cellular network. The purpose of the Location function is to find a cell with the best radio reception characteristics for a specific mobile station. The purpose of the Presence Verification function is to verify the presence of the mobile station in the selected cell prior to handoff. The purpose of the Handoff function is to safely transfer an ongoing call from one cell to another that, according to the Location function and the Presence Verification function, is better suited to handle the call. Handoffs can also be conducted within the same cell to another channel or to and from an overlaid cell such as between a 800-MHz cell and an overlaid 1900-MHz cell.

Seamless interoperability for mobile stations roaming between cells in a multi-hyperband capable MSC requires that each mobile station have complete neighbor cell information, and that each base station have the capability to perform the Location and Presence Verification functions for each hyperband utilized in the base station and its neighbor cells. For mobile stations in the busy (on-call) operating mode, there are two alternative methods of performing the Location function and identifying when a handoff should be initiated. One method utilizes mobile assisted handoff (MAHO), and the mobile station performs the Location function. When a mobile station begins operating on a digital traffic channel, the mobile station measures the quality of the radio link connection by measuring the bit error rate and the received signal strength on its assigned channel. The mobile station also measures the signal quality of channels in neighboring cells indicated in a measurement order from the base station. The channels included in the measurement order are reference frequencies of neighboring cells. In accordance with the teachings of the present invention, mobile stations that are dual-hyperband capable receive a neighbor list that includes neighbor cells and outer cells operating at both 800 MHz and 1900 MHz. Mobile stations that operate only in the 800-MHz cellular telephone hyperband receive a neighbor list that includes only neighbor cells and outer cells operating at 800-MHz. The base station receives channel quality messages from its neighboring cells and compares the channels with each other. The base station considers received signal strength and propagation path loss (transmitted power level minus received signal strength). Parameters in the base station determine whether a request for handoff should be sent to the MSC.

The other Location method, referred to as the classical location method, does not utilize MAHO, and the Location function is performed by assessing radio link quality in the serving base station and its neighboring base stations. The serving base station measures the quality of the radio link connection by measuring the received signal strength on the serving channel. The serving base station then considers received signal strengths and propagation path loss (transmitted power level minus received signal strength). Parameters in the base station are then utilized to determine whether a request for handoff should be sent to the MSC. The MSC then requests measurements of the serving channel from neighbor cells and outer cells, each of which have signal strength receivers for this purpose. The MSC then ranks the neighbor cells and outer cells to build a candidate list for handoff.

In cellular systems that do not utilize MAHO, location and verification devices are installed in each base station. The location and verification devices are capable of independently measuring the signal strength on each hyperband operated by the base station and its neighbor cells.

Presence Verification is performed following the Location process and prior to handoff in order to verify the presence of the mobile station in the cell which has been designated as the best candidate cell for handoff. Presence Verification is performed in the base station of a neighboring cell on order from the serving MSC. When operating on a digital traffic channel, the base station in the candidate cell for handoff is given the mobile station's old channel number, rate, time slot, and digital verification color code (DVCC), and is ordered to verify the mobile station's presence on the old channel. A final signal strength measurement of the mobile station's signal is made in the candidate handoff cell utilizing its location and verification device, and if the signal strength exceeds a predetermined threshold, the handoff is initiated. When operating on an analog voice channel, signal strength is measured on the voice channel for the serving channel Supervisory Audio Tone (SAT). The verification information is reported to the MSC.

Presence verification may be performed with or without the use of MAHO to perform the Location function. Presence Verification measurements are made by the location and verification devices in the base station of the candidate handoff cell. There may be a separate location and verification device for each hyperband, or a single location and verification device having a signal strength receiver capable of measuring signal strengths in multiple hyperbands. If a multi-hyperband capable mobile station is operating in a 800-MHz cell, the present invention determines whether it is better to operate in another 800-MHz cell or in a cell in any other measured hyperband.

Figure 2A:
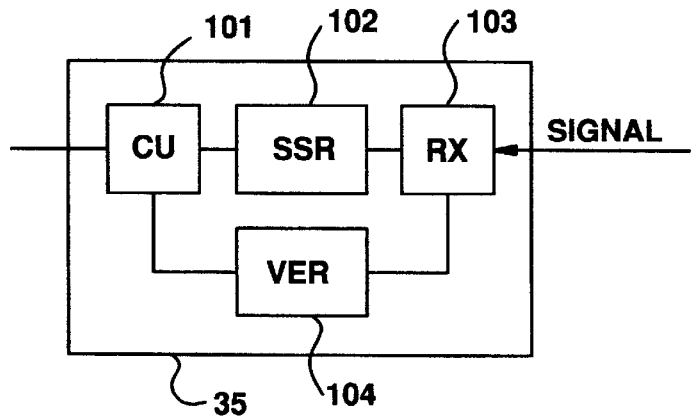
FIGS. 2A–2C are high level block diagrams of alternative embodiments of a location and verification device.
Figure 2B:
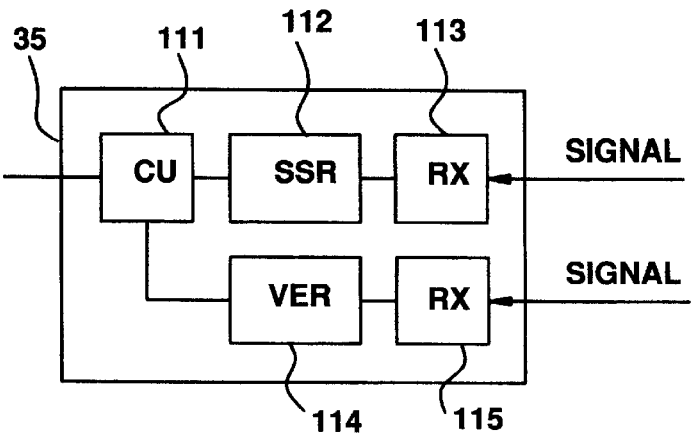
Figure 2C:
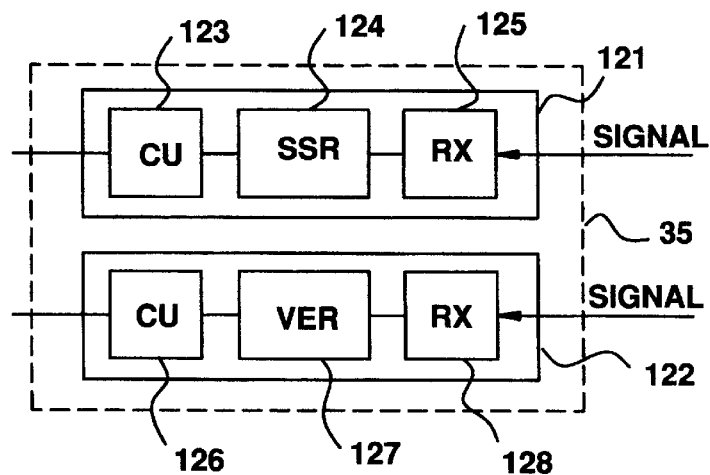

FIGS. 2A–2C are high level block diagrams of alternative embodiments of a location and verification device 35 which performs cyclical location measurements as well as the verification signal strength measurement on demand. Referring first to FIG. 2A, it is shown that each location and verification device comprises a control unit (CU) 101, a signal strength receiver (SSR) 102, a receiver (RX) 103, and a verification device (VER) 104. The location and verification device 35 utilizes the SSR 102 and RX 103 to perform cyclical sampling measurements of radio signals received from mobile stations operating on voice channel frequencies allocated to neighboring cells. The results of the sampling measurements are updated in the CU 101 as a mean value (also considering previous measurements) after each sampling cycle. This mean value is provided to neighboring cells upon request in order to ascertain whether the cell operating the location and verification device 35 is a good candidate cell for handoff.

When the location and verification device is requested to perform a verification measurement, the CU 101 may interrupt the cyclical measurements by the SSR 102 for the VER 104 to perform the signal strength measurement.

FIG. 2B is a high level block diagram of a second embodiment of a location and verification device 35 which performs both the cyclical location measurements as well as the verification signal strength measurement. Once again, the location and verification device comprises a control unit (CU) 111, a signal strength receiver (SSR) 112, a receiver (RX) 113, and a verification device (VER) 114. However, a second receiver 115 is added to the signal path for the verification function. The VER 114 then performs the signal strength measurement for the verification function without interrupting the cyclical measurements of the SSR 112.

FIG. 2C is a high level block diagram of a third embodiment of a location and verification device 35 which performs both the cyclical location measurements as well as the verification signal strength measurement. In this embodiment, the location and verification device 35 is divided into a location component 121 and a verification component 122 which are functionally independent. The location component includes a control unit (CU) 123, a signal strength receiver (SSR) 124, and a receiver (RX) 125. The verification component 122 includes a control unit (CU) 126, a verification device (VER) 127, and a receiver (RX) 128. The verification component 122 then performs the signal strength measurement for the verification function without interrupting the cyclical measurements of the location component 121.

The above description of the Location, Presence Verification, and Handoff functions described multi-hyperband handoff within the coverage area of a single MSC. Handoffs may also be performed across exchange boundaries between a cell in one MSC and an outer cell in another MSC. In addition to performing the Location, Presence Verification, and Handoff functions in multiple hyperbands, cellular networks supporting multi-hyperband, inter-exchange handoffs for mobile stations must exchange outer cell information and hyperband information between the MSCs involved. The standard protocol for inter-exchange signaling is IS-41. When an inter-exchange handoff is performed between single hyperband MSCs, known IS-41 messages are utilized to carry required information between the exchanges for handoff of the call. These messages may include a handoff measurement request (HandMeasReq) message, a facilities directive (FacDir) message, a Handoff Back (HandBack) message, and a handoff-to-third (HandThird) message.

The handoff measurement request message is utilized to request locating measurements for outer cells in the classical location method, in order to assess the best candidate outer cell for handoff. The same message is also utilized to request Presence Verification information in neighbor outer cells, in order to verify the presence of the mobile station in those cells and assess the best candidate outer cell. If the serving MSC determines that the handoff is to be made to an outer cell in a neighboring MSC, then a voice channel is requested.

When multiple hyperbands are in use in the MSCs involved in a handoff, new message parameters are required at handoff to select a hyperband based on the requested call mode, the mobile station frequency hyperband capability, signal quality with neighbor outer cells, and hyperband capability of neighbor outer cell base stations, and to select radio equipment operating in the selected hyperband. The new message parameters are described below.

FIG. 3 is an illustrative drawing of a signaling message constructed in accordance with the standard IS-41 intersystem communications protocol and showing a hierarchy of message parameters and information elements. Each IS-41 message comprises a number of message parameters. Each message parameter, in turn, further comprises a number of information elements. Each information element is a multiple of an 8-bit byte of information. In the example illustrated in FIG. 3, a Handoff Measurement Request Invoke message 41 is shown to include a Digital Channel Data message parameter 42. Within the Digital Channel Data message parameter 42 is a 16-bit Channel Number (CHNO) information element 43.

Message parameters in IS-41 are classified as either mandatory or optional. Mandatory parameters are always sent in IS-41 messages. An optional parameter added as a message suffix may override a corresponding existing mandatory parameter, or may replace an existing optional parameter in the message. In IS-41, the Digital Channel Data message parameter 42 is an existing optional parameter.

Figure 4:
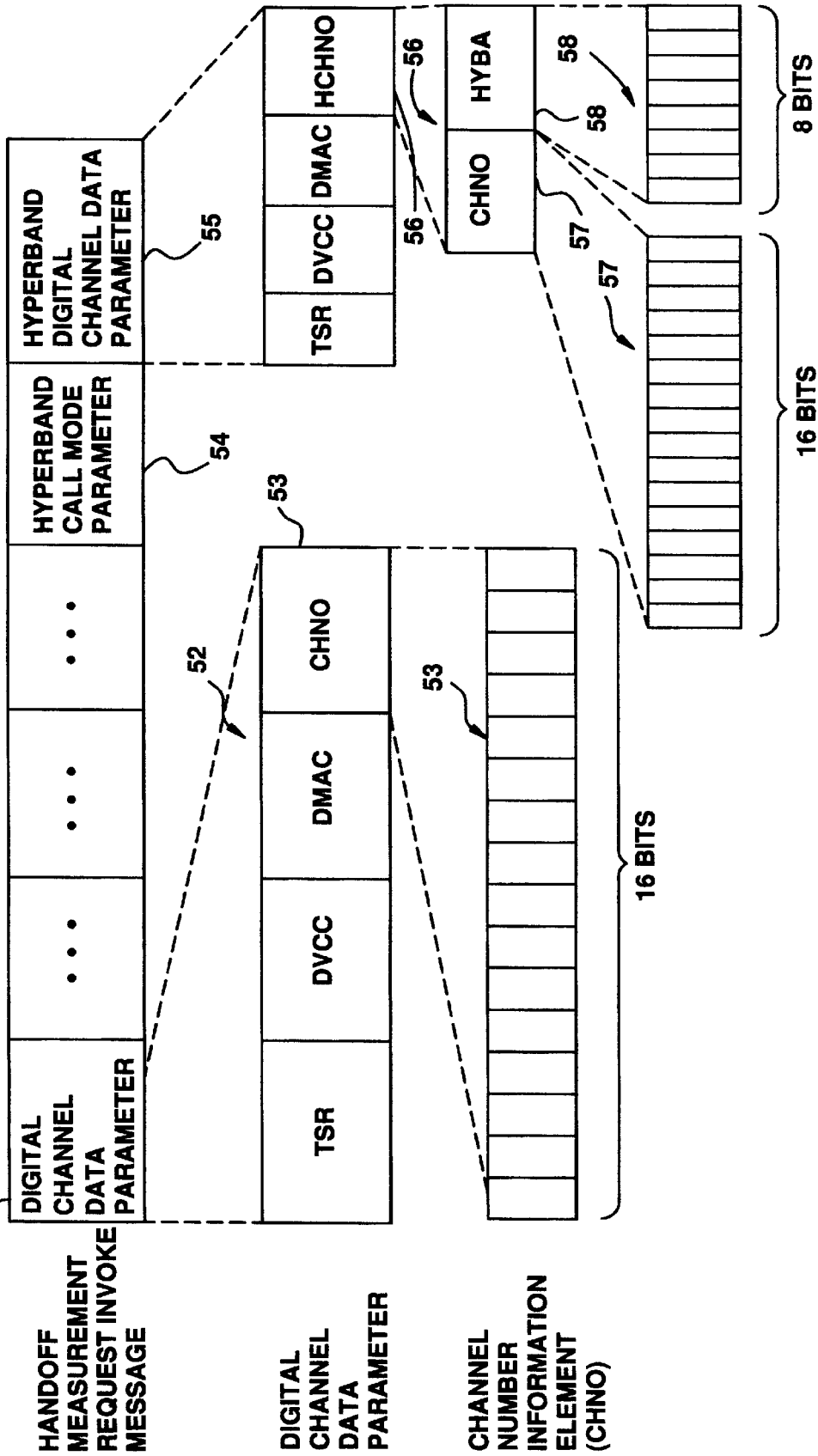
FIG. 4 is an illustrative drawing of an IS-41 signaling message modified in accordance with the teachings of the present invention and showing a hierarchy of message parameters and information elements.

FIG. 4 is an illustrative drawing of an IS-41 signaling message modified in accordance with the teachings of the present invention and showing a hierarchy of message parameters and information elements. The present invention utilizes extensions in the form of optional parameters to achieve the desired functionality. By utilizing existing IS-41 message formats and adding optional parameters, new contiguous information elements are created. A clean solution is provided with minimal impact on the cellular network. In the example illustrated in FIG. 4, a Handoff Measurement Request Invoke message 51 is shown to include an existing optional Digital Channel Data (DCD) message parameter 52. Within the DCD message parameter 52 is a 16-bit Channel Number (CHNO) information element 53. However, the Handoff Measurement Request Invoke message 51 has been modified to include optional message parameters Hyperband Call Mode (HCM) 54 and Hyperband Digital Channel Data (HDCD) 55 added as message suffixes. The optional HDCD message parameter 55 replaces the existing DCD message parameter 52 and includes a 24-bit Hyperband Channel Number (HCHNO) information element 56. The HCHNO information element 56 may further comprise a 16-bit CHNO information element 57 and an 8-bit Hyperband (HYBA) information element 58 capable of accommodating the new additional information required for the simultaneous support of multi-hyperband systems.

Information Elements

Table 1 illustrates the applicable information elements that are utilized in the enhanced IS-41 signaling messages to implement full seamless interoperability between multi-hyperband exchanges providing voice, data, and fax services utilizing United States cellular standards. Each of these information elements is discussed in the following paragraphs.

TABLE 1

Information Elements in Enhanced IS-41 Messages

| MESSAGES | TSR | DMAC | DVCC | CHNO | HYBA | BW | VM | SC | TBC | PV | VCC | ISLP |
|---|---|---|---|---|---|---|---|---|---|---|---|---|
| RegNot RR |  |  |  |  | X |  | X |  |  |  | X |  |
| QualDir INV |  |  |  |  | X |  | X |  |  |  | X |  |
| QualReq RR |  |  |  |  | X |  | X |  |  |  | X |  |
| LocReq INV |  |  |  |  |  |  | X |  |  |  |  |  |
| LocReq RR |  |  |  |  |  |  | X |  |  |  |  |  |
| Route Req INV |  |  |  |  |  |  | X |  |  |  |  |  |
| Route Req RR |  |  |  |  |  |  | X |  |  |  |  |  |
| FacDir INV | Y | Z | Z | Z | X | X | X | X | X | X |  | X |
| HandBack INV | Y | Z | Z | Z | X | X | X | X | X | X |  |  |
| HandThird INV | Y | Z | Z | Z | X | X | X | X | X | X |  |  |
| FacDir RR | Y | Z | Z | Z | X |  |  |  |  |  |  | X |
| HandBack RR | Y | Z | Z | Z | X |  |  |  |  |  |  |  |
| HandThird RR | Y | Z | Z | Z | X |  |  |  |  |  |  |  |
| HandMeasReq INV | Y | Z | Z | Z | X | X | X | X |  |  |  |  |
| InterSys Page INV |  |  |  |  |  |  |  | X | X | X |  |  |

Key:
X: New information element
Y: Existing information element that requires extensions
Z: Existing information (not requiring extension)

Time Slot and Rate (TSR)

The Time Slot and Rate Indicator (TSR) is a 5-bit field defined in EIA 627 that indicates the time slot and rate for the assigned traffic channel. The TSR is compatible with the Assigned Time Slots field defined in IS-136.

Digital Mobile Attenuation Code (DMAC)

The Digital Mobile Attenuation Code (DMAC) is a 4-bit field commanding the initial mobile power level when assigning a mobile station to a digital traffic channel.

Digital Verification Color Code (DVCC)

The Digital Verification Color Code (DVCC) is an 8-bit code that is sent from the base station to the mobile station, and is employed for the generation of a Coded DVCC (CDVCC). The CDVCC is used to identify each cell or cell sector, and is transmitted in all messages generated by the base station. Among other uses, this makes it possible to detect messages coming from another cell utilizing the same frequency.

Channel Number (CHNO)

The Channel Number (CHNO) is a 16-bit code utilized to identify the digital traffic channel within the specified hyperband.

Hyperband (HYBA)

The Hyperband (HYBA) information element is supported in the MSC and provides frequency band information as shown in table 2. The frequency band information is needed in order to specify the hyperband associated with the specified channel. The HYBA information element is transferred during an inter-exchange handoff. In the exemplary embodiment of the multi-hyperband system of the present invention, two frequency hyperbands are identified. It should be understood, however, that the present invention may support inter-exchange handoffs between MSCs operating in a greater number of frequency hyperbands. In order to ensure multi-hyperband support, the HYBA parameter is of variable length, with values $hyba_1 \ldots hyba_n$.

TABLE 2

| Hyperband (HYBA) |
| --- |
| Hyperband |
| 800 MHz |
| 1900 MHz |
| *** |

Bandwidth (BW)

The Bandwidth (BW) information element is supported in the MSC and identifies the digital traffic channel bandwidth requirements for the requested call as shown in Table 3. The BW information element is transferred during an inter-exchange handoff and is included in inter-exchange handoff related messages to identify variable call rates (half rate, fill rate, etc.).

TABLE 3

| Bandwidth (BW) |
| --- |
| Bandwidth |
| Half Rate Digital Traffic Channel Only |
| Full Rate Digital Traffic Channel Only |
| Half or Full Rate DTC - Full Rate Preferred |
| Half or Full Rate DTC - Half Rate Preferred |
| Double Full Rate DTC Only |
| Triple Full Rate DTC Only |

Voice Mode (VM)

The Voice Mode (VM) information element is supported in the MSC and identifies the mode to be used for the requested Voice Call as shown in Table 4. The VM information element is transferred during an inter-exchange handoff in order to support switching of speech quality mode during a call. In order to support future expansion, the VM parameter is of variable length.

TABLE 4

| Voice Mode (VM) |
| --- |
| Voice Mode |
| No Voice Coder |
| VSELP Voice Coder |
| SOC/BMSC Specific Signaling |
| High Quality Voice Coder |
| *** |

Service Code (SC)

The Service Code (SC) information element is supported in the MSC and indicates the requested service as shown in Table 5. The SC information element is transferred during call delivery and inter-exchange handoff. During call delivery, the information element conveys information regarding asynchronous data and G-3 fax services. Once a mobile station establishes a call on a digital traffic channel, the mobile station continues to use the same form of channel coding even after handoff to another exchange. Consequently, the SC information must be included in inter-exchange handoff related messages. Additional services may be added as desired.

TABLE 5

| Service Code (SC) |
| --- |
| Service Code |
| Analog Speech Only |
| Digital Speech only |
| Analog or Digital - Analog Preferred |
| Analog or Digital - Digital Preferred |
| Async Data |
| G3 Fax |
| *** |

Terminal Band Capability (TBC)

The Terminal Band Capability (TBC) information element is supported in the MSC and indicates the frequency bands supported by the mobile station as shown in Table 6. The TBC information element is transferred during an inter-exchange handoff in order to distinguish the bands supported by the mobile station/terminal due to channel limitations of the terminal. In order to ensure multi-hyperband support, additional hyperbands and bands may be added as desired. Note here that the terminal's band capabilities are determined and dictated by the terminal itself.

TABLE 6

| Terminal Band Capability (TBC) |
| --- |
| Terminal Band Capability |
| 800 MHz A&B Bands Supported |
| 1900 MHz A Band Supported |
| 1900 MHz B Band Supported |
| 1900 MHz C Band Supported |
| 1900 MHz D Band Supported |
| 1900 MHz E BandSupported |
| 1900 MHz F Band Supported |
| *** |

Protocol Version (PV)

The Protocol Version (PV) information element is supported in the MSC and indicates the mobile station's protocol version as shown in Table 7. The mobile station's supported protocol version is sent to candidate and target MSC's by the serving MSC during an inter-exchange handoff. Additional protocol versions may be added to the information element as desired.

TABLE 7

| Protocol Version (PV) |
| --- |
| Protocol Version |
| Reserved for compatibility |
| TIA/EIA 627 |
| IS-136 |
| PN3388 |
| *** |

Voice Coder Capability

The Voice Coder Capability (VCC) information element is supported in the home location register (HLR) and in combined visitor location registers/mobile switching centers (VLR/MSC) and specifies which voice coder the subscriber is capable of supporting as shown in Table 8. This information either allows the subscriber to obtain service or restricts the subscriber from obtaining service dependent on the supported voice coder level. Additional voice coders may be added to the information element as desired. The VCC is included as part of the subscriber profile.

TABLE 8

Voice Coder Capability (VCC)

Voice Coder Capability

No Voice Coders Supported
VSELP Voice Coder Supported
SOC/BMSC Specific Signaling
High Quality Voice Coder Supported
***

Intersystem Link Protocol

The Intersystem Link Protocol (ISLP) information element is supported in the MSC/VLR and specifies the protocol to be used on inter-MSC trunks during intersystem handoff of a data call as shown in Table 9 below. The protocol types are defined in IS-41.

Time Divided Multiple Access (TDMA) systems utilize IS-136 and provide a related family of standardized digital services. IS-130 is the protocol used to convey data stream information (asynchronous, synchronous, etc.) over the air interface. However, IS-130 does not convey coded voice over the digital traffic channel (DTC). The Radio Link Protocol defined by IS-130, specifies how the data stream from the mobile DTE (modem) gets formatted in Protocol Data Units (PDU's) to be transferred over the DTC. The ISLP information element allows the specification of the method for RLP frames adaptation to DS0 format on inter-MSC trunks. The process of RLP frame adaption to DS0 converts RLP PDU's that typically operate at data rates of 9.6 Kbps, 14.4 Kbps and 28.8 Kbps (typical modem speeds) to 64 Kbps. The ISLP information element specifies this conversion. This conversion may be made, for example, by padding a PDU with bits to generate a 64 Kbps stream.

TABLE 9

Intersystem Link Protocol (ISLP)

Intersystem Link Protocol

Type 1
Type 2
Type 3
***

MESSAGE PARAMETERS

Enhanced IS-41 messages include message parameters comprising one or more of the information elements described above. New message parameters implemented in Enhanced IS-41 signaling are described below.

Hyperband Digital Channel Data (HDCD)

A new optional parameter termed the "Hyperband Digital Channel Data" (HDCD) includes the following information elements:
Time Slot Rate (TSR);
Digital Mobile Attenuation Code (DMAC);
Digital Verification Color Code (DVCC);
Channel Number (CHNO); and
Hyperband (HYBA).

The HDCD parameter is used to indicate the TSR, the DMAC, the DVCC, the CHNO, and the HYBA of a digital channel.

Hyperband Call Mode (HCM)

A new optional parameter termed the "Hyperband Call Mode" (HCM) includes the following information elements:
Preferred Bandwidth (BW);
Voice Mode (VM); and
Service Code (SC).

The HCM parameter is utilized to indicate the preferred BW, VM, and SC modes of the current hyperband call.

Terminal Characteristics (TCH)

A new optional parameter termed the "Terminal Characteristics" (TCH) includes at least the following information elements:
Terminal Band Capability (TBC); and
Protocol Version (PV).

The TCH parameter is used to indicate the TBC and the supported PV of the mobile station (terminal) (i.e. the frequency bands and protocol version supported by the terminal). It may also include information elements indicative of other terminal characteristics such as analog voice channel, asynchronous data and fax service support.

Subscriber Characteristics (SCH)

A new optional parameter termed the "Subscriber Characteristics" (SCH) includes at least the following information elements:
Bandwidth (BW);
Voice Coder Capability (VCC); and
Service Code (SC).

The features supported by the subscription will be included in the SCH parameter. This is also referred to as subscriber service profile information. This parameter is used to indicate the air interface bandwidths, VCC and different services allowed for a subscriber.

A cellular operator may have three options for asynchronous data and fax service activation. First, one Directory Number (DN) or Mobile Identification Number (MIN) can be used to support all services. This may require that an activation status be associated with each of these services in order to have only one of these services active at one time. The second option is to provide a DN for each of the asynchronous data and fax services, in addition to the voice service. An activation status may also be required for each of these services. With this alternative, the asynchronous data and fax service code value is not required. In the final option, a service number prefix is used to identify the service supported by an operator. With this alternative, the asynchronous data and fax service code value is required. An activation status may also be required for each of these services.

Inter-MSC Circuit Info

A new optional parameter termed "Inter-MSC Circuit Info" includes the following information element:
ISLP This parameter is utilized to indicate the preferred attribute that is requested on the inter-MSC circuit trunk.

Service Info

A new optional parameter termed "Service Info" includes the following information element:
Service Code (SC)

This parameter is utilized to indicate the requested service type at call delivery.

ENHANCED IS-41 MESSAGES

The key transactions/messages defined by the present invention are listed in Table 1. The messages support either call delivery or inter-hyperband/inter-exchange handoffs, as indicated. In particular, these messages support handoffs between two hyperbands (i.e., from 800 MHz to 1900 MHz and vice versa), and between cells in two exchanges both operating at 1900 MHz. The messages include:

Registration Notification Return Result (RegNot RR)

Figure 8:
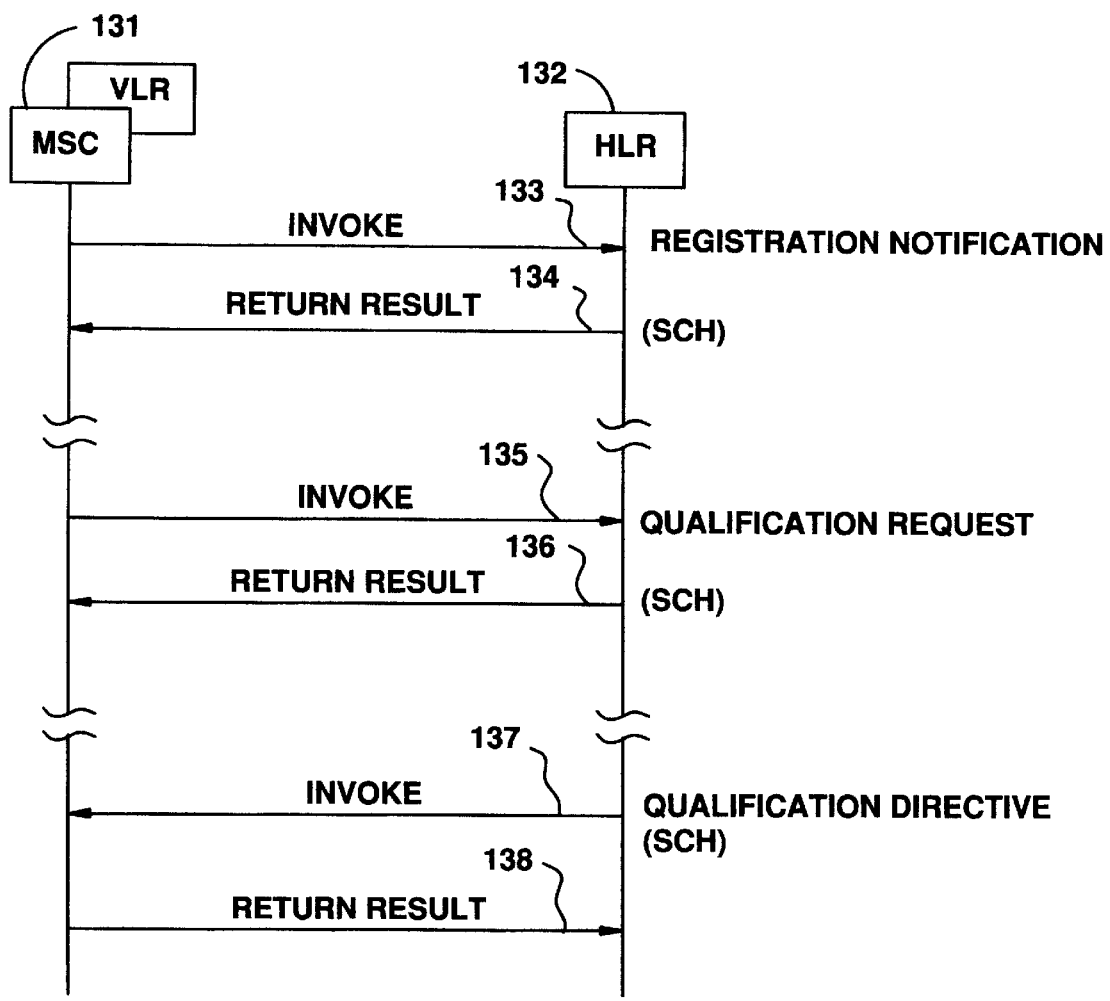
FIG. 8 is a signaling diagram illustrating the flow of messages between a visited MSC and a home location register (HLR) during various stages of call delivery in the preferred embodiment of the present invention.

This message is modified in order to support call delivery. If the subscriber is allowed to roam, the HLR will include the VCC, SC and BW information elements in the Subscriber Characteristics (SCH) parameter as part of the subscriber profile in the RegNot RR message sent towards the V-MSC. The use of the RegNot RR message and SCH parameter is illustrated in FIG. 8.

Qualification Directive Invoke (QualDir INV)

This message is modified in order to support call delivery. At any change in a roaming subscriber's profile, the HLR forwards to the VMSC, a QualDir INV message including the VCC, SC and BW information elements as part of the Subscriber Characteristics (SCH) parameter. The use of the QualDir INV message and SCH parameter is illustrated in FIG. 8.

Qualification Request Return Result (QualReq RR)

This message is also modified in order to support call delivery. If the V-MSC determines that a roaming subscriber needs to be validated in order to be provided service, the HLR sends to the V-MSC a QualReq RR message including the VCC, SC and BW information elements as part of the Subscriber Characteristics (SCH) parameter. The use of the QualReq RR message and SCH parameter is illustrated in FIG. 8.

Location Request Invoke (LocReq INV)

This message is modified in order to support call delivery for different types of service such as voice, asynchronous data, and G3 fax. During the call delivery process, the Service Info parameter indicating the type of call is conveyed in the Location Request Invoke message from the gateway MSC to the HLR at the roaming number (RN) (e.g., Temporary Location Directory Number (TLDN)) enquiry for the called subscriber.

Location Request Return Result (LocReq RR)

This message is modified in order to support call delivery for different types of service such as voice, asynchronous data, and G3 fax. During the call delivery process, the service info parameter indicating the type of call granted is conveyed in the Location Request Return Result message from the HLR back to the gateway MSC at RN (e.g., TLDN) enquiry for the called subscriber.

Route Request Invoke (RouteReq INV)

This message is modified in order to support call delivery for different types of service such as voice, asynchronous data, and G3 fax. During the call delivery process, the Service Info indicating the type of call is conveyed in the Route Request Invoke message from the HLR to the MSC/VLR at RN(e.g., TLDN) enquiry for the called subscriber.

Route Request Return Result (RouteReq RR)

This message is modified in order to support call delivery for different types of services such as voice, asynchronous data, and G3 fax. During the call delivery process, the Service Info parameter indicating the type of call granted is conveyed in the Route Request Return Result message from the MSC/VLR to the HLR at RN(e.g., TLDN) enquiry for the called subscriber.

Facilities Directive Invoke (FacDir INV)

This message is modified to support the inter-hyperband/inter-exchange handoff process including voice, asynchronous data and G3 fax services. During the inter-hyperband/inter-exchange handoff process, the serving MSC (anchor MSC) indicates to the target MSC via a Facilities Directive Invoke message, information that includes the frequency bands supported by the mobile station, the current serving hyperband of the mobile station, and the protocol to be used on inter-MSC trunks during intersystem handoff of circuit switched data calls. This information is conveyed by including in the FacDir INV message the HDCD, HCM, TCH and Inter-MSC Circuit Info message parameters.

Handoff Back Invoke (HandBack INV)

This message is modified to support the inter-hyperband/inter-exchange handoff process including voice, asynchronous data, and G3 fax services. If the serving MSC decides to handoff the mobile station back to the previously-serving MSC (i.e., anchor exchange), the serving MSC sends to the target MSC (i.e., anchor exchange) a Handoff Back Invoke message with information on the current serving hyperband of the mobile station. This information is conveyed by including the HDCD, HCM, and TCH message parameters in the HandBack INV message.

Handoff to Third Invoke (HandThird INV)

This message is modified to support the inter-hyperband/inter-exchange handoff process including voice, asynchronous data, and G3 fax services. If the serving MSC (non-anchor) decides to make a handoff of the mobile station to a new third target exchange (not the anchor exchange), the serving MSC sends a Handoff to Third Invoke message toward the anchor MSC to perform path minimization with information on the current serving hyperband of the mobile station. This information is conveyed by including the HDCD, HCM, and TCH message parameters in the HandThird INV message.

Facilities Directive Return Result (FacDir RR)

This message is modified to support the inter-hyperband/inter-exchange handoff process including voice, asynchronous data, and G3 fax services. Following reception of a Facilities Directive Invoke message from an anchor MSC, the target MSC searches for a free voice channel in the selected cell. The target MSC returns the hyperband of the selected channel and Inter-MSC protocol in the Facilities Directive Return Result message towards the anchor MSC. This information is conveyed by including the HDCD and Inter-MSC Circuit Info message parameters in the FacDir RR message.

Handoff Back Return Result (HandBack RR)

This message is modified to support the inter-hyperband/inter-exchange handoff process including voice, asynchronous data, and G3 fax services. Following reception of a Handoff Back Invoke message from a serving exchange, the anchor MSC searches for a free voice channel in the selected cell. The target MSC (anchor exchange) returns the hyperband of the selected channel in the Handoff Back Return Result message towards the serving exchange. This information is conveyed by including the HDCD message parameter in the HandBack RR message.

Handoff to Third Return Result (HandThird RR)

This message is modified to support the inter-hyperband/inter-exchange handoff process including voice, asynchronous data, and G3 fax services. Following reception of a Handoff to Third Invoke message from a serving exchange, the anchor MSC searches for a free voice channel in the selected cell of the target MSC. The anchor MSC returns the hyperband of the selected channel in the Handoff to Third Return Result message towards the serving exchange indicating the new voice channel. This information is conveyed by including the HDCD message parameter in the HandThird RR message.

Handoff Measurement Request Invoke (HandMeasReq INV)

This message is modified to support the inter-hyperband/inter-exchange handoff process. The serving MSC sends a Handoff Measurement Request Invoke message to the cooperating exchange initiating location measurements in the cooperating MSC. The HandMeasReq INV message contains the serving hyperband of the mobile station. This information is conveyed by including the HDCD and the HCM message parameters in the HandMeasReq INV message. Private information allowing inter-exchange mobile station presence verification is also included in the HandMeasReq INV message.

A number of additional parameters are added to the HandMeasReq INV message as well as the Handoff Measurement Request Return Result (HandMeasReq RR) message in order to support the Presence Verification function as shown in Table 10 below.

TABLE 10

Handoff Measurement Request Message

| Parameter | INV or RR | Description |
|---|---|---|
| NOCTV | INV | Number of candidate cells to verify |
| CELLID | INV | Candidate cell ID list (for up to six cells) |
| VERRES | RR | Verification results for candidate cell list (for up to six cells) |
| SQBQ | RR | Signal quality and average burst quality for candidate cells (for up to six cells) |
| SIGCODE | INV and RR | Signal code |
| FCODE | RR | Fault code when no successful presence verification is reported for any candidate cell |

Intersystem Page Invoke (InterSys Page INV)

Figure 9:
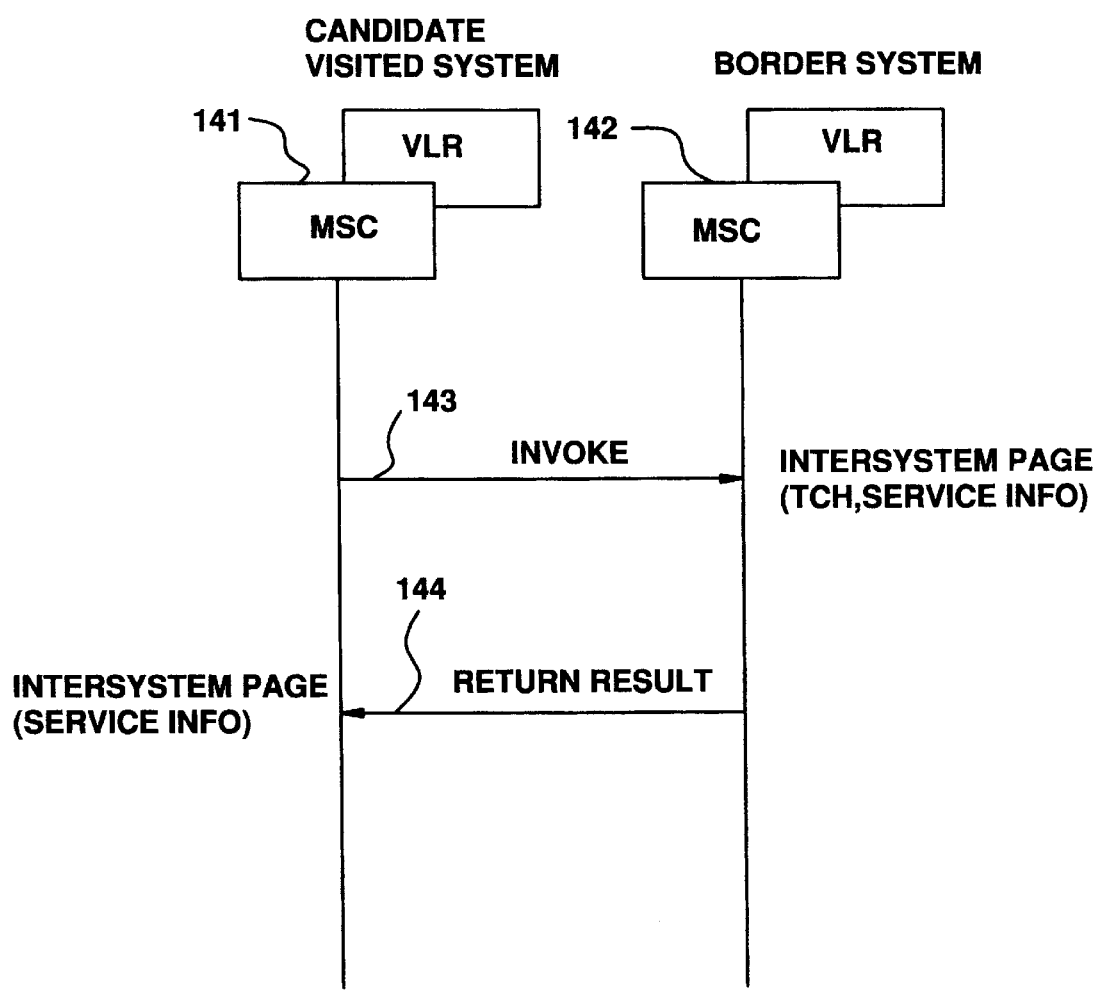
FIG. 9 is a signaling diagram illustrating intersystem page messages between a candidate visited MSC and a border MSC in the preferred embodiment of the present invention.

This message is modified to support call delivery. When a subscriber has "roamed away" from a serving visited exchange, a page attempt is made by the system to reach the subscriber in a border exchange. Consequently, during the paging process, the current V-MSC performing intersystem paging, sends to the border exchange, an Intersystem Page Invoke message including information on the supported bands and hyperbands of the mobile station and the requested service (asynchronous data, G3 fax, or voice). This information is conveyed by including the TCH and the Service Info message parameters in the InterSys Page INV message. The TCH message parameter also conveys terminal information regarding asynchronous data and fax service support in the terminal. The use of the InterSys Page INV message is illustrated in FIG. 9.

Figure 5:
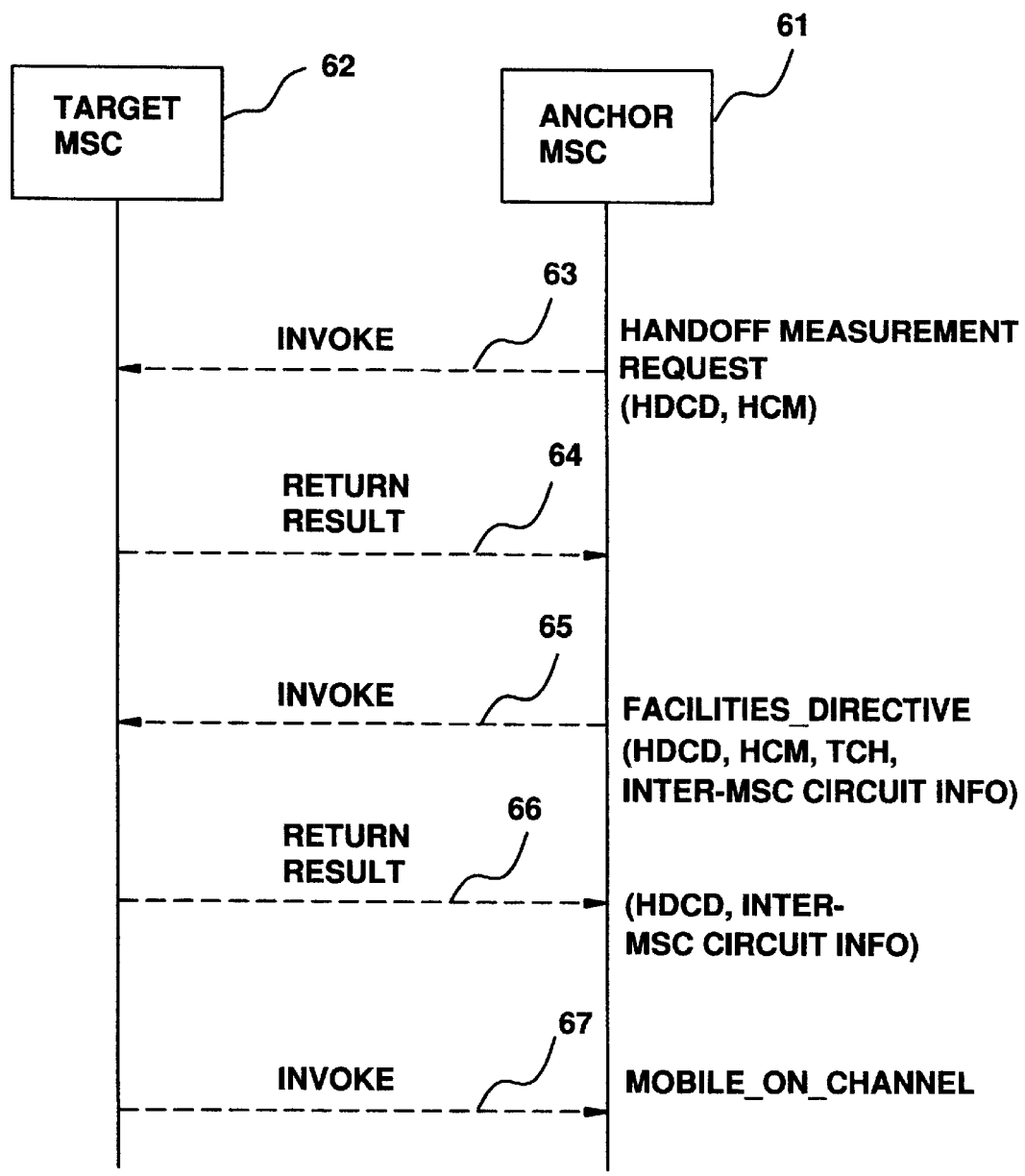
FIG. 5 is a signaling diagram illustrating the flow of messages during handoff of a mobile station from an anchor MSC to a target MSC in the preferred embodiment of the cellular telecommunications network of the present invention.

FIG. 5 is a signaling diagram illustrating the flow of messages during handoff of a mobile station from an anchor MSC 61 to a target MSC 62 in the preferred embodiment of the cellular telecommunications network of the present invention. The process begins when the anchor MSC 61 sends a Handoff Measurement Request Invoke message 63 to the target MSC 62. The Handoff Measurement Request Invoke message may include the HDCD and the HCM message parameters. The target MSC 62 then returns a Handoff Measurement Request Return Result message 64 to the anchor MSC 61. The anchor MSC then sends a Facilities Directive Invoke message 65 to the target MSC and may include the HDCD, HCM, TCH and Inter-MSC Circuit Info message parameters. The target MSC returns a Facilities Directive Return Result message 66 and may include the HDCD and Inter-MSC Circuit Info message parameters. The target MSC 62 then sends a Mobile on Channel Invoke message 67 to the anchor MSC 61 when the handoff is complete.

Figure 6:
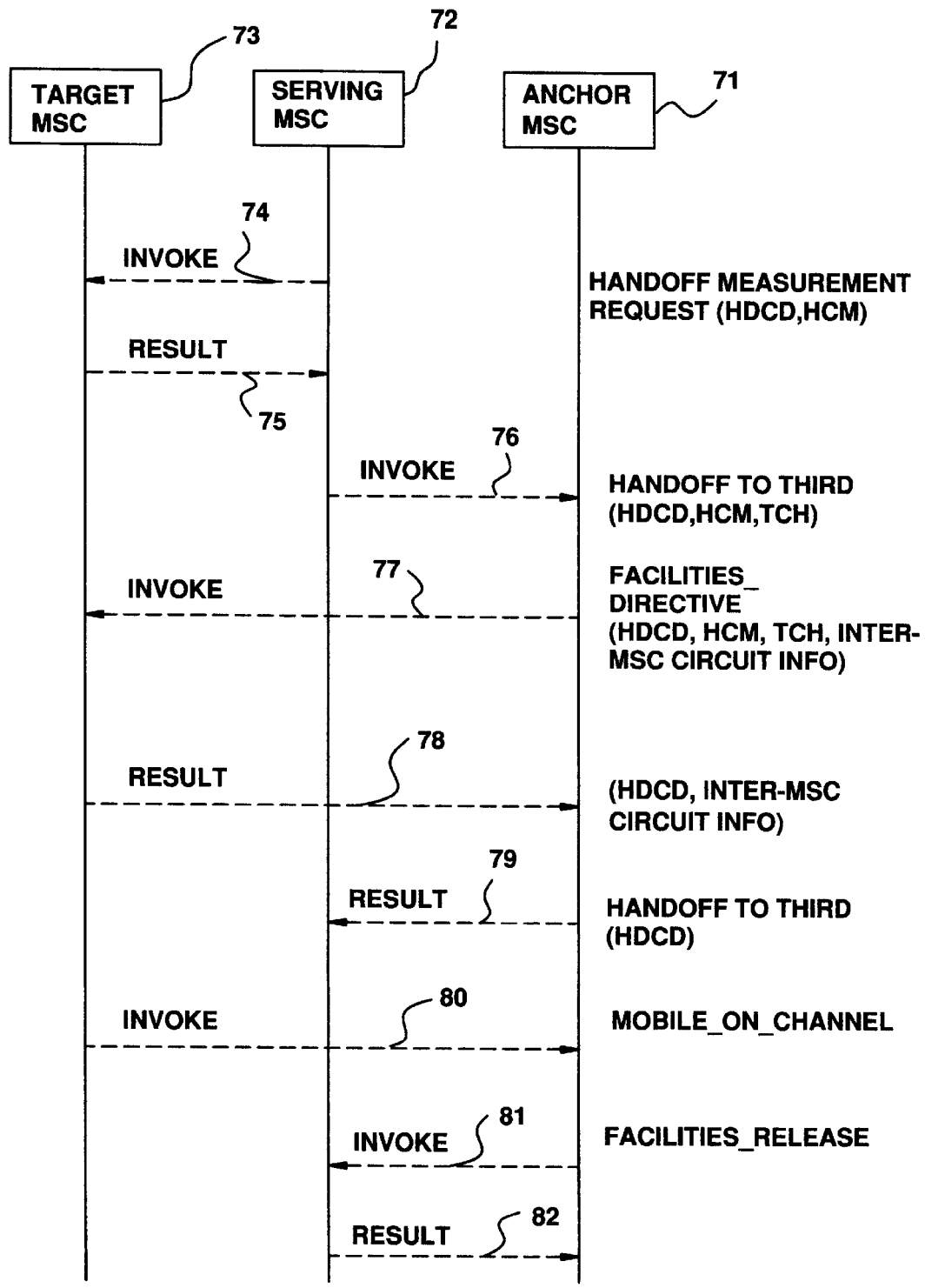
FIG. 6 is a signaling diagram illustrating the flow of messages between an anchor MSC, a serving MSC, and a target MSC during handoff to third with path minimization of a mobile station from the serving MSC to the target MSC in the preferred embodiment of the cellular telecommunications network of the present invention.

FIG. 6 is a signaling diagram illustrating the flow of messages between an anchor MSC 71, a serving MSC 72, and a target MSC 73 during handoff-to-third with path minimization of a mobile station from the serving MSC 72 to the target MSC 73 in the preferred embodiment of the cellular telecommunications network of the present invention. The handoff-to-third process begins when the serving MSC sends a Handoff Measurement Request Invoke message 74 to the target MSC and may include the HDCD and the HCM message parameters. The target MSC 73 returns a Handoff Measurement Request Return Result message 75 to the serving MSC. The serving MSC 72 then sends a Handoff to Third Invoke message 76 to the anchor MSC 71 and may include the HDCD, HCM, and TCH message parameters. The anchor MSC 71 then sends a Facilities Directive Invoke message 77 to the target MSC 73 and may include the HDCD, HCM, TCH and Inter-MSC Circuit Info message parameters. The target MSC returns a Facilities Directive Return Result message 78 and may include the HDCD and Inter-MSC Circuit Info message parameters. The anchor MSC 71 then sends a Handoff to Third Return Result message 79 to the serving MSC 72 and may include the HDCD message parameter. When the handoff is complete, the target MSC 73 sends a Mobile on Channel Invoke message 80 to the anchor MSC 71. The anchor MSC then sends a Facilities Release Invoke message 81 to the serving MSC 72. Finally, the serving MSC returns a Facilities Release Return Result message 82 to the anchor MSC.

Figure 7:
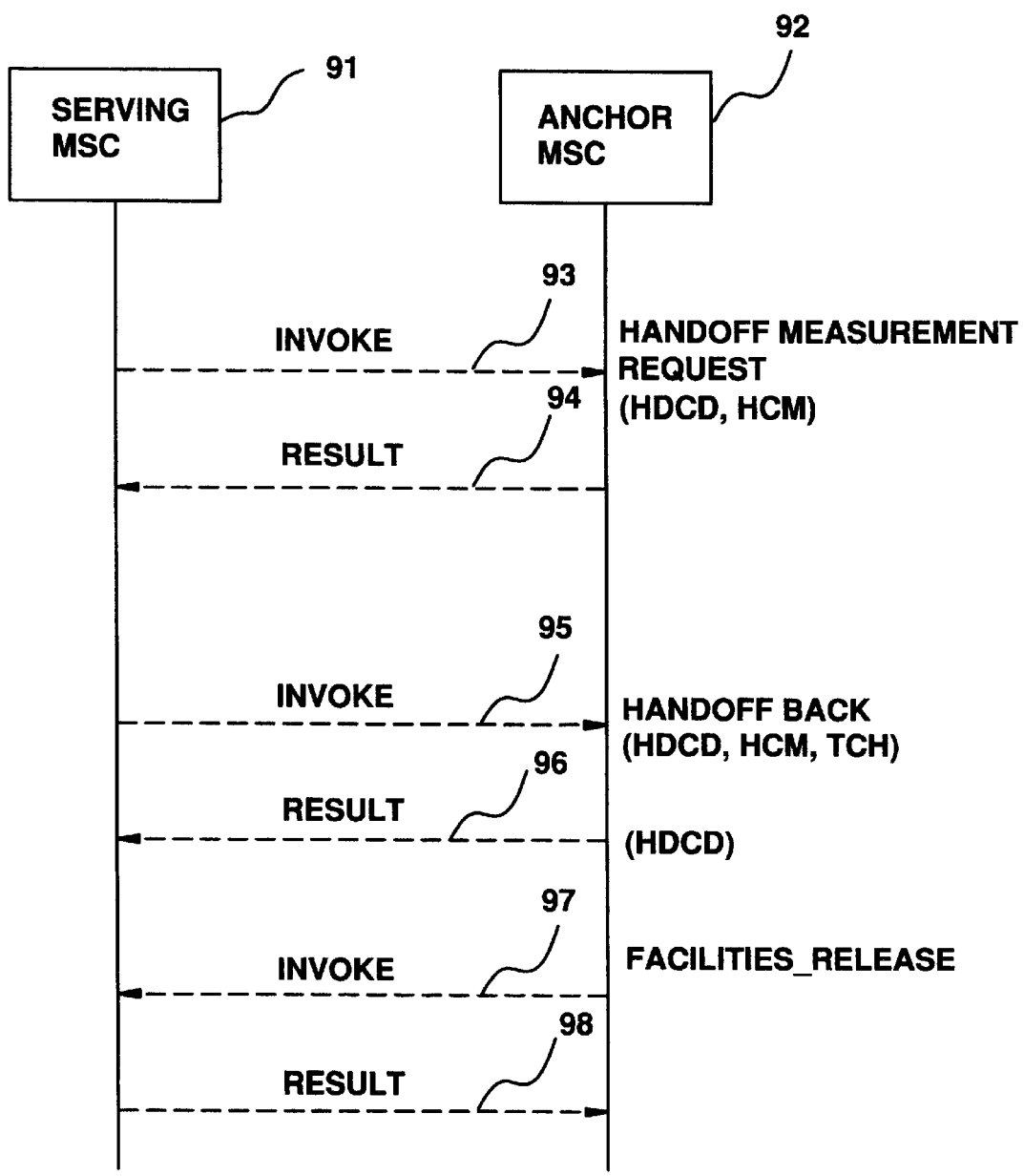
FIG. 7 is a signaling diagram illustrating the flow of messages during handoff of a mobile station back from a serving MSC to an anchor MSC in the preferred embodiment of the cellular telecommunications network of the present invention.

FIG. 7 is a signaling diagram illustrating the flow of messages during handoff of a mobile station back from a serving MSC 91 to an anchor MSC 92 in the preferred embodiment of the cellular telecommunications network of the present invention. The handoff back process begins when the serving MSC 91 sends a Handoff Measurement Request Invoke message 93 to the anchor MSC 92 and may include the HDCD and the HCM message parameters. The anchor MSC returns a Handoff Measurement Request Return Result message 94 to the serving MSC. The serving MSC 91 then sends a Handoff Back Invoke message 95 to the anchor MSC 92 and may include the HDCD, HCM, and TCH message parameters. The anchor MSC returns a Handoff Back Return Result message 96 to the serving MSC and may include the HDCD and Inter-MSC Circuit Info message parameters. The anchor MSC 92 then sends a Facilities Release Invoke message 97 to the serving MSC 91. Finally, the serving MSC returns a Facilities Release Return Result message 98 to the anchor MSC.

FIG. 8 is a signaling diagram illustrating the flow of messages between a visited MSC 131 and a home location register (HLR) 132 during various stages of call delivery in the preferred embodiment of the present invention. FIG. 8 first illustrates a Registration Notification Invoke (RegNot INV) message 133 that is sent from the V-MSC 131 to the HLR 132 when a roaming subscriber attempts to register in the VMSC. If the subscriber is allowed to roam, the HLR includes the Subscriber Characteristics (SCH) parameter as part of the subscriber profile in a Registration Notification Return Result (RegNot RR) message 134 sent towards the V-MSC.

FIG. 8 next illustrates a Qualification Request Invoke (QualReq INV) message 135 that is sent from the V-MSC 131 to the HLR 132 if the V-MSC requires validation of a roaming subscriber in order to provide service. The HLR then sends to the V-MSC a Qualification Request Return Result (QualReq RR) message 136 including the Subscriber Characteristics (SCH) parameter.

FIG. 8 next illustrates a Qualification Directive Invoke (QualDir INV) message 137 that is sent from the HLR 132 to the V-MSC 131 at any change in a roaming subscriber's profile. The QualDir INV message includes the Subscriber Characteristics (SCH) parameter. The V-MSC 131 then returns a Qualification Directive Return Result (QualDir RR) message 138 to the HLR 132.

FIG. 9 is a signaling diagram illustrating intersystem page messages between a candidate visited MSC 141 and a border MSC 142 in the preferred embodiment of the present invention. When a subscriber has "roamed away" from a serving visited exchange, a page attempt is made by the system to reach the subscriber in a border exchange. Consequently, during the paging process, the current V-MSC performing intersystem paging (candidate V-MSC), sends to the border exchange, an Intersystem Page Invoke (InterSys Page INV) message 143 including information on the supported bands and hyperbands of the mobile station and the type of service provided (voice, asynchronous data, and G3 fax). This information is conveyed by including the TCH and Service Info message parameters (including the SC information element) in the InterSys Page INV message. The border MSC 142 then returns an Intersystem Page Return Result (InterSys Page RR) message 144 to the candidate visited MSC 141, specifying the granted service type by including the Service Info parameter.

Figure 10:
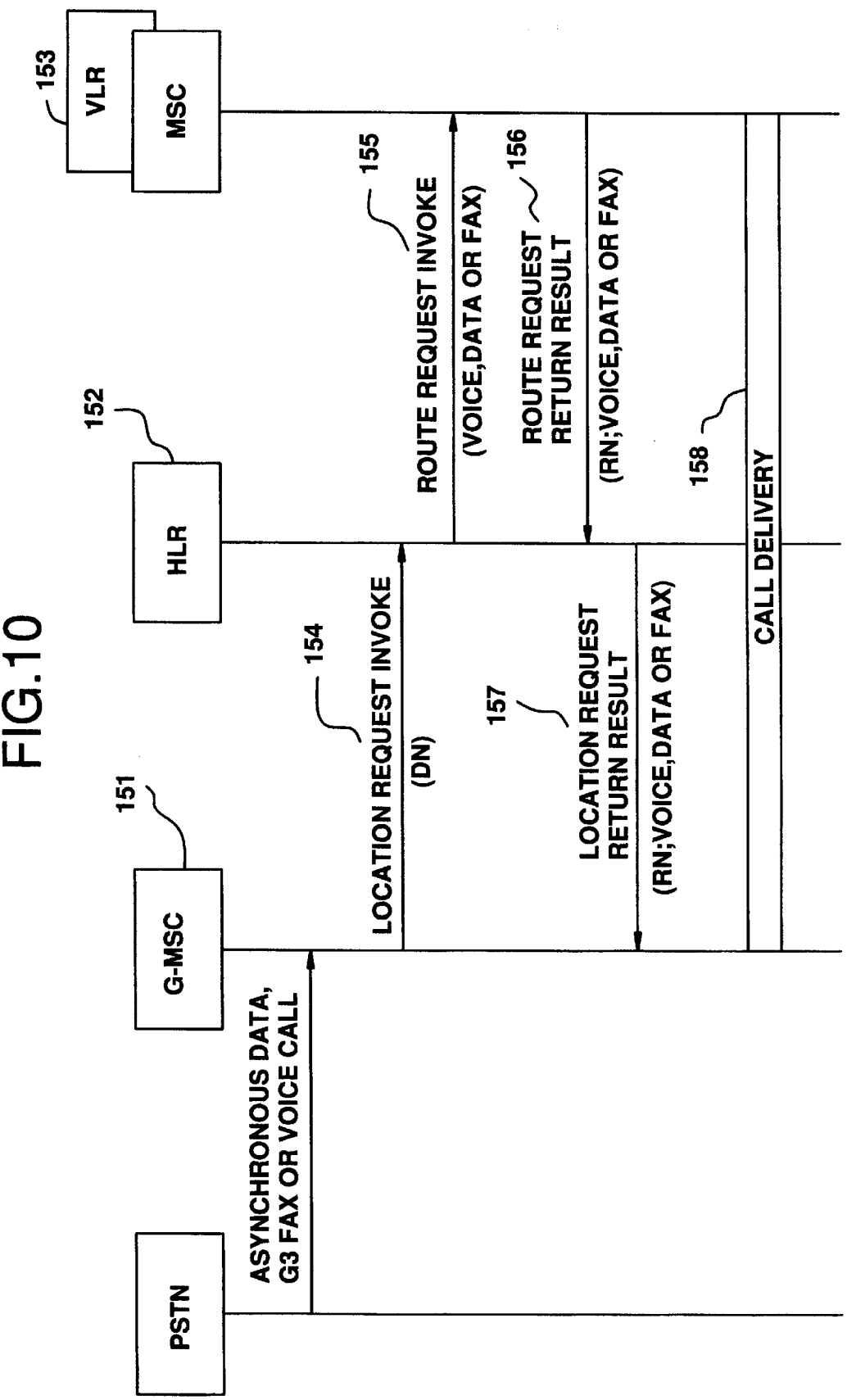
FIG. 10 is a signaling diagram illustrating one-stage dialing call delivery between a Gateway Mobile Switching Center (G-MSC) and another MSC.

FIG. 10 is a signaling diagram illustrating one-stage dialing call delivery between a Gateway Mobile Switching Center (G-MSC) and another MSC. A calling PSTN subscriber places a data or fax call through a modem to a cellular subscriber. The dialed number corresponds to the cellular subscriber's asynchronous data service number or the Mobile Identification Number/Subscriber Number (MIN/SNB), which is recognized by the PSTN. When the cellular subscriber number is dialed, the PSTN routes the call to the corresponding G-MSC 151. One number is utilized for each service, therefore the G-MSC is not involved in discriminating the type of call (Voice, asynchronous data, G3 fax). Once this DN is received in the GMSC, the G-MSC 151 queries the HLR 152 for the called subscriber's roaming number (RN) or TLDN, with a Location Request Invoke message 154. The HLR 152 associates the subscriber DN with either a voice call, an asynchronous data call or G3 fax call and checks the call activation status of the DN. The HLR 152 interrogates the MSC/VLR 153 for the RN. The Routing Request Invoke message contains an indication that this is for a voice, asynchronous data or G3 fax call. The MSC/VLR 153 notes the requested service information contained in the RouteReq INV message 155, processes the Routing Request Invoke and returns a Routing Request Return Result message 156 to the HLR 152, which returns a Location Request Return Result message 157 to the G-MSC 151. The MSC/VLR 153 verifies if the call activation status is set or if a modification is taking place. The MSC/VLR 153 may or may not return a RN depending on whether the MSC/VLR supports the requested data call service or whether the targeted subscriber is in a state where it is capable of accepting the data call. In FIG. 10, MSC/VLR 153 determines that it supports the requested data call service and the subscriber is capable of accepting the call. Therefore, the MSC/VLR 153 returns a RN and the accepted service code (SC) in the Route Request Return Result 156 message. When the RN is received by the G-MSC 151, the call is routed at 158 to the MSC/VLR 153. Additionally, the MSC/VLR 153 handles the routed call and provides the requested service.

FIG. 11 is a signaling diagram illustrating two-stage dialing call delivery between a G-MSC and another MSC. A calling PSTN subscriber places a data or fax call through a modem to a called cellular subscriber. The dialed number corresponds to the cellular carrier's asynchronous data or G3 fax service number, which is recognized by the PSTN. The PSTN subscriber's modem receives a second dial tone. Upon receiving this dial tone, the PSTN subscriber's modem dials the called cellular subscriber's DN.

When the cellular carrier's asynchronous data or G3 fax service number is dialed, the PSIN routes the call to the corresponding G-MSC 160. Upon recognizing an incoming call from the PSTN as the asynchronous data or G3 fax service number, the G-MSC 160 sends a second dial tone toward the calling PSTNs modem to request the called cellular subscriber's DN. Upon receiving this DN, the G-MSC 160 queries the HLR 161 for the called subscriber's RN (e.g., Temporary Location Directory Number (TLDN)), and indicates the requested service call information (asynchronous data or G3 fax) in the Location Request Invoke message 163. Upon reception of a LocReq INV message, the HLR 161 interrogates the appropriate MSC/VLR 162 for the RN of the cellular subscriber in a Routing Request Invoke message 164 if the service is subscribed to and is found to be activated. The Routing Request Invoke message 164 contains an indication of the requested service. When the MSC/VLR 162 receives the RN interrogation for a visiting subscriber, it verifies the indication of the requested service in the message. This information is used to set up the call to the visiting subscriber appropriately as voice, asynchronous data or G3 fax in the MSC/VLR 162. The MSC/VLR 162 also verifies if the call activation status is set or if a modification is taking place. The MSC/VLR 162 may or may not return a RN, depending on whether the MSC/VLR supports the requested data call services or whether the targeted subscriber is in a state where it is capable of accepting the data call. In FIG. 11, MSC/VLR 162 determines that it supports the requested data call service and the subscriber is capable of accepting the call. Therefore, the MSC/VLR 162 returns a RN and the accepted service code (SC) in the Route Request Return Result 165 message. The MSC/VLR 162 returns a Routing Request Return Result message 165 to the HLR 161, which returns a Location Request Return Result message to the G-MSC 160, and the call is routed at 167 to the MSC/VLR 162 which handles the routed call for the given activated service.

Figure 12A:
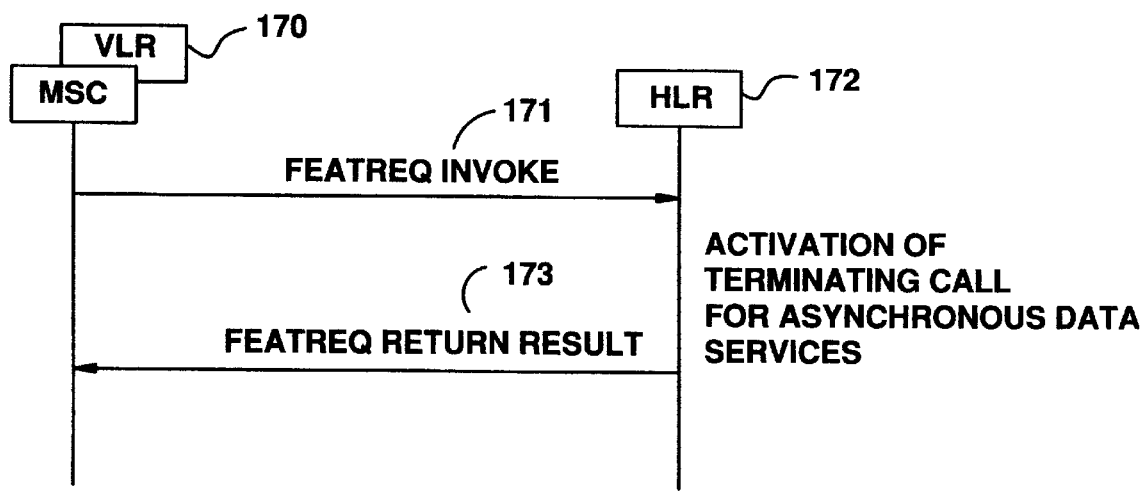
FIGS. 12A–12D are signaling diagrams illustrating service activation and de-activation of terminating calls for asynchronous data and G-3 fax services.

FIGS. 12A–12D are signaling diagrams illustrating service activation and de-activation of terminating calls for asynchronous data and fax services. Referring first to FIG. 12A, messages involved in the activation of a terminating call for asynchronous data services are illustrated. Upon the reception of a feature code call in the V-MSC 170 from the subscriber, the V-MSC 170 sends a Remote Feature Control Request Invoke message 171 to HLR 172 with the appropriate information (MIN, Service Code, Activation Status) to update the subscriber's status. The HLR 172 updates the status accordingly. The HLR 172 sends a Remote Feature Control request result message 173 to MSC 170.

Figure 12B:
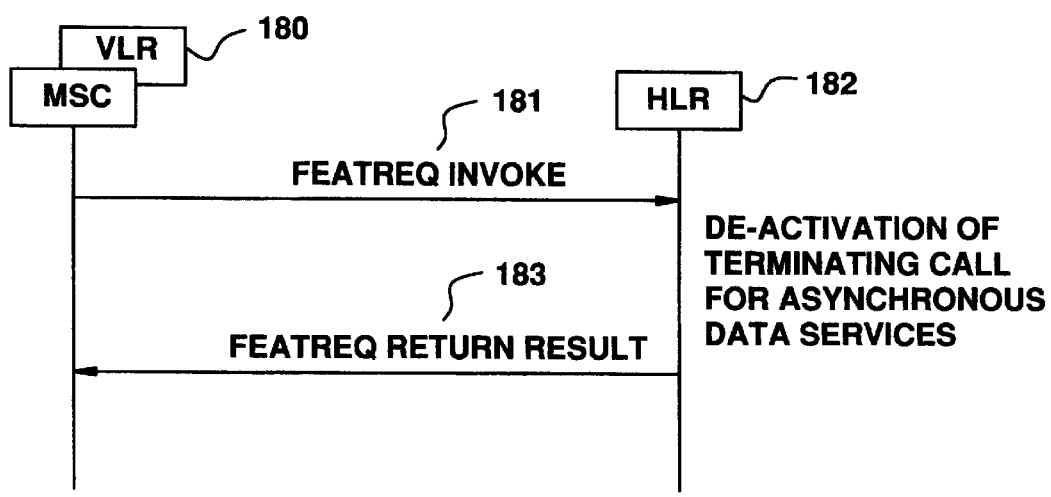

FIG. 12B illustrates the messages involved in the de-activation of a terminating call for asynchronous data services. Upon the reception of a feature code call in the V-MSC 180 from the subscriber, the V-MSC 180 sends a Remote Feature Control Request Invoke message 181 to HLR 182 with the appropriate information (MIN, Service Code, Activation Status) to update the subscriber's status. The HLR 182 updates the status accordingly. The HLR 182 sends a Remote Feature Control request result message 183 to MSC 180.

Figure 12C:
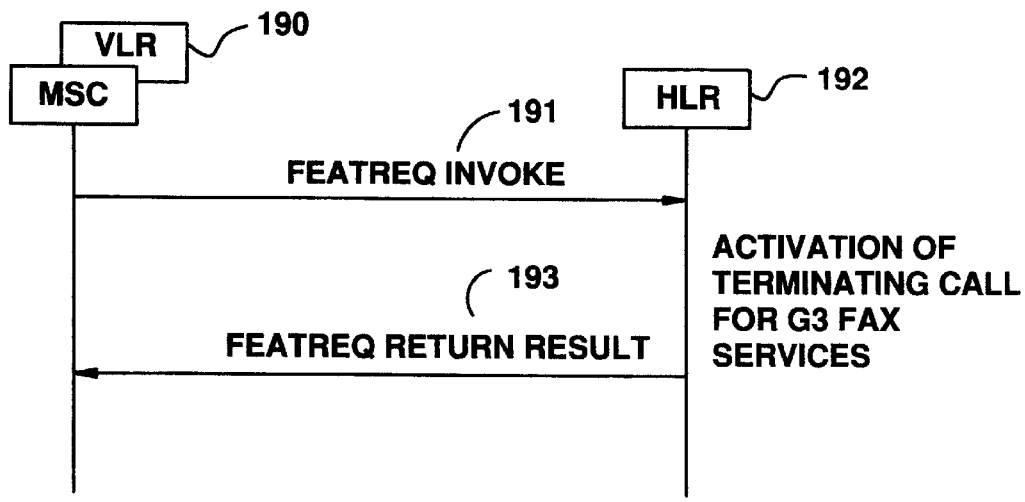

FIG. 12C illustrates the messages involved in the activation of a terminating call for G3 fax services. Upon the reception of a feature code call in the V-MSC 190 from the subscriber, the V-MSC 190 sends a Remote Feature Control Request Invoke message 191 to HLR 192 with the appropriate information (MIN, Service Code, Activation Status) to update the subscriber's status. The HLR 192 updates the status accordingly. The HLR 192 sends a Remote Feature Control request result message 193 to MSC 190.

Figure 12D:
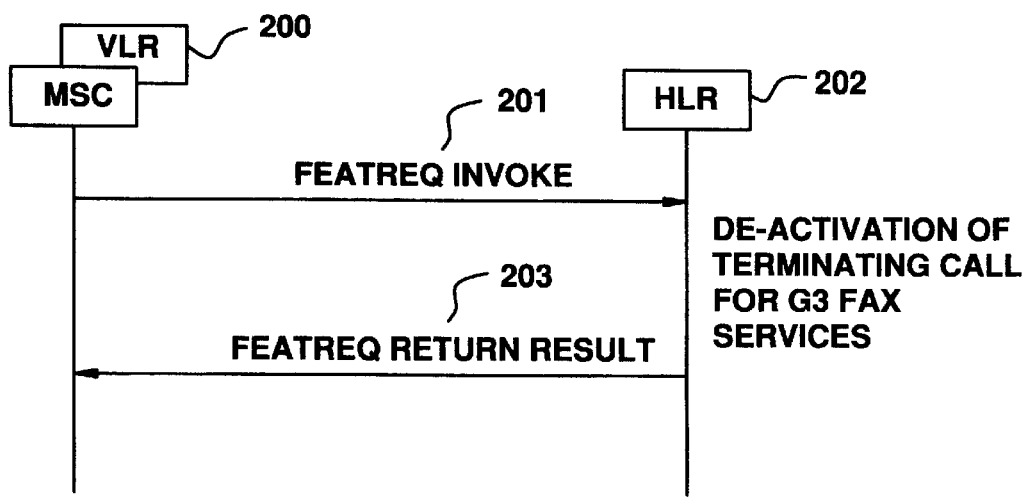

FIG. 12D illustrates the messages involved in the de-activation of a terminating call for G3 fax services. Upon the reception of a feature code call in the V-MSC 200 from the subscriber, the V-MSC 200 sends a Remote Feature Control Request Invoke message 201 to HLR 202 with the appropriate information (MIN, Service Code, Activation Status) to update the subscriber's status. The HLR 202 updates the status accordingly. The HLR 202 sends a Remote Feature Control request result message 203 to MSC 200.

Figure 13:
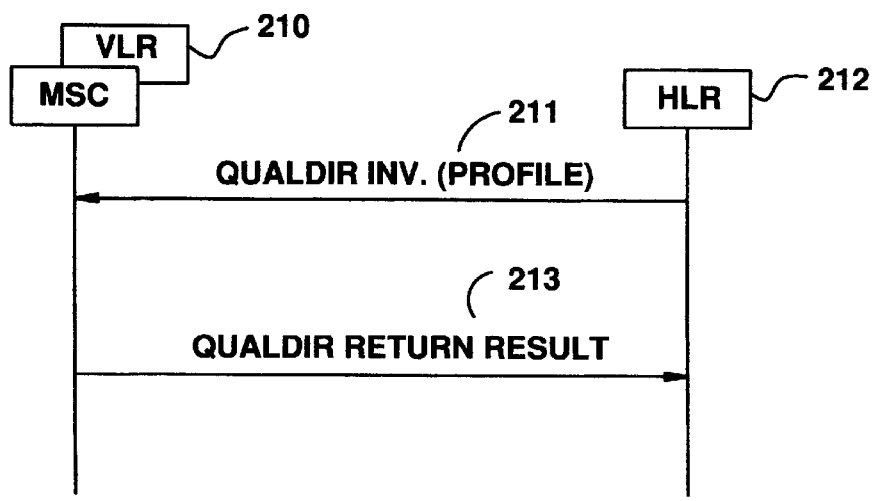
FIG. 13 is a signaling diagram illustrating the changing of a subscriber profile in the MSC/VLR as a result of a successful Remote Feature Control Request (FEATREQ).

FIG. 13 is a signaling diagram illustrating the updating of a subscriber's profile to an MSC/VLR with a Qualification Directive (QUALDIR). When a Remote Feature Control Request message (See FIGS. 12A–12D) results in a change of a subscriber profile, the HLR 212 reports the change of profile to V-MSC 210 (where the subscriber is registered) through a Qualification Directive Invoke message 211. The FEATREQ message alters the profile by modifying the activation field associated with the authorized services. The V-MSC 210 then sends a QUALDIR Return Result message 213 to HLR 212.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A cellular telecommunications network providing seamless call delivery inter-change handoffs, inter-exchange cell reselections inter-hyperband handoffs, and inter-hyperband cell reselections for voice calls, asynchronous data calls, and facsimile calls for a mobile station roaming between multi-hyperband capable exchanges, said cellular telecommunications network comprising:

a plurality of mobile switching centers (MSCs) having means for operating in a plurality of frequency hyperbands;

a plurality of base stations connected to each of said plurality of MSCs, said base stations having transmission and reception equipment operating in the plurality of frequency hyperbands;

an inter-exchange communications protocol for communicating information required for seamless interoperability between said plurality of MSCs and said plurality of frequency hyperbands, said inter-exchange communications protocol comprising:

a plurality of signaling messages in an industry standard message format, and a plurality of modified message parameters within sad signaling messages, said modified message parameters including unmodified information elements, modified information elements, and new information elements which provide seamless call delivery, inter-exchange handoffs, inter-exchange cell reselections, inter-hyperband handoffs, and inter-hyperband cell reselections for voice calls, asynchronous data calls, and facsimile calls between said multi-hyperband capable exchanges and said plurality of frequency hyperbands.

2. The cellular telecommunications network of claim 1 wherein said industry standard message format is the IS-41 message format.

3. The cellular telecommunications network of claim 2 wherein said transmission and reception equipment operates in an 800-MHz cellular telephone hyperband and a 1900-MHz personal communication system (PCS) hyperband.

4. The cellular telecommunications network of claim 2 wherein said modified message parameters include new optional parameters that override mandatory parameters in said signaling messages, said optional parameters including said information elements which provide seamless call delivery, handoffs, and reselections between said multi-hyperband capable exchanges and said plurality of frequency hyperbands.

5. The cellular telecommunications network of claim 4 wherein said modified message parameters include new optional parameters that replace existing optional parameters in said signaling messages, said new optional parameters including said information elements which provide seamless call delivery, handoffs, and reselections between said multi-hyperband capable exchanges and said plurality of frequency hyperbands.

6. The cellular telecommunications network of claim 5 wherein said unmodified IS-41 information elements include:

an information element that commands initial mobile station power level;

an information element that identifies particular cells; and an information element that identifies digital traffic channel numbers.

7. The cellular telecommunications network of claim 6 wherein said modified IS-41 information elements include an information element that indicates a time slot and rate for an assigned traffic channel.

8. The cellular telecommunications network of claim 7 wherein said new information elements include:

an information element that provides frequency band information for specifying a hyperband for a channel;

an information element that identifies digital traffic channel bandwidth requirements;

an information element that identifies a voice mode for requested voice calls;

an information element that identifies requested services;

an information element that indicates which frequency bands and hyperbands are supported by a mobile station;

an information element that indicates a mobile station's protocol version;

an information element that indicates which voice coders are supported by a mobile subscriber; and an information element that indicates an intersystem link protocol for asynchronous data calls and facsimile calls between exchanges.

9. The cellular telecommunications network of claim 8 wherein said optional parameters include Hyperband Digital Channel Data (HDCD), Hyperband Call Mode (HCM), Terminal Characteristics (TCH), and Subscriber Characteristics (SCH).

10. The cellular telecommunications network of claim 9 wherein a first subset of said plurality of signaling messages supports call delivery for voice, asynchronous data, and facsimile services to said mobile station.

11. The cellular telecommunications network of claim 10 wherein said first subset of said plurality of signaling messages includes a Registration Notification Return Result message, a Qualification Directive Invoke message, a Qualification Request Return Result message, a Location Request Invoke message, a Location Request Return Result message, a Routing Request Invoke message, a Routing Request Return Result message, and an Intersystem Page Invoke message.

12. The cellular telecommunications network of claim 10 wherein a second subset of said plurality of signaling messages supports inter-hyperband and inter-exchange handoff for voice, asynchronous data, and facsimile services to said mobile station.

13. The cellular telecommunications network of claim 12 wherein said second subset of said plurality of signaling messages includes a Facilities Directive Invoke message, a Handoff Back Invoke message, a Handoff to Third Invoke message, a Facilities Directive Return Result message, a Handoff Back Return Result message, a Handoff to Third Return Result message, and a Handoff Measurement Request Invoke message.

14. A method of providing seamless call delivery inter-exchange handoffs, inter-exchange cell reselections inter-hyperband handoffs, and inter-hyperband cell reselections for voice calls, asynchronous data calls, and facsimile calls for a mobile station roaming between a plurality of multi-hyperband capable exchanges in a cellular telecommunications network, said method comprising the steps of:

connecting a plurality of multi-hyperband capable mobile switching centers (MSCs) to a plurality of base stations having transmission and reception equipment operating in a plurality of frequency hyperbands; and communicating information between said plurality of MSCs with an inter-exchange communications protocol having a plurality of signaling messages comprising a plurality of message parameters, said communicating step further comprising the steps of:

formatting said plurality of signaling messages in an industry standard message format, and modifying said plurality of signalling messages and said plurality of message parameters by adding modified information elements and new information elements which, together with unmodified information elements, provide seamless call delivery, inter-exchange handoffs, inter-exchange cell reselections, inter-hyperband handoffs, and inter-hyperband cell reselections for voice calls, asynchronous data calls, and fascimile calls between said multi-hyperband capable exchanges and said plurality of frequency hyberbands.

15. The method of claim 14 wherein said step of formatting said plurality of signaling messages in an industry standard message format includes formatting said messages in the IS-41 message format.

16. The method of claim 15 wherein said step of connecting to each MSC, a plurality of base stations includes connecting base stations having transmission and reception equipment that operates in an 800-MHz cellular telephone hyperband and a 1900-MHz personal communication system (PCS) hyperband.

17. The method of claim 15 wherein said step of modifying said plurality of signaling messages and said plurality of message parameters includes adding new optional parameters that override mandatory parameters in said signaling messages, said optional parameters including said information elements which provide seamless call delivery handoffs, and reselections between said multi-hyperband capable exchanges and said plurality of frequency hyperbands.

18. The method of claim 17 wherein said step of adding new optional parameters that override mandatory parameters in said signaling messages includes adding optional parameters with unmodified IS-41 information elements, modified IS-41 information elements, and new information elements.

19. The method of claim 18 wherein said step of modifying said plurality of signalling messages and said plurality of message parameters includes adding new optional parameters that replace existing optional parameters in said signaling messages, said new optional parameters including said information elements which provide seamless call delivery, handoffs, and reselections between said multi-hyperband capable exchanges and said plurality of frequency hyperbands.

* * * * *